United States Patent
Kawai et al.

[11] Patent Number: 5,965,811
[45] Date of Patent: Oct. 12, 1999

[54] FLOW RATE DETECTING ELEMENT AND FLOW RATE SENSOR USING SAME

[75] Inventors: Masahiro Kawai; Akira Yamashita; Tomoya Yamakawa; Yutaka Ohashi, all of Tokyo, Japan

[73] Assignee: Mitsubishi Denki Kabushiki Kaisha, Tokyo, Japan

[21] Appl. No.: 08/940,964

[22] Filed: Sep. 30, 1997

[30] Foreign Application Priority Data

Jun. 19, 1997 [JP] Japan ..................................... 9-162935

[51] Int. Cl.⁶ ....................................................... G01F 1/68
[52] U.S. Cl. ....................................... 73/204.26; 73/118.2
[58] Field of Search ........................... 73/204.26, 204.25, 73/204.19, 204.18, 204.15, 118.2

[56] References Cited

U.S. PATENT DOCUMENTS

| | | | |
|---|---|---|---|
| 5,060,511 | 10/1991 | Sakaue et al. | 73/204.26 |
| 5,291,781 | 3/1994 | Nagata et al. | 73/204.26 |
| 5,852,239 | 12/1998 | Sato et al. | 73/204.26 |

FOREIGN PATENT DOCUMENTS

| | | |
|---|---|---|
| 19527861 | 1/1997 | Germany . |
| 60-142268 | 7/1985 | Japan . |
| 08166271 | 6/1996 | Japan . |

*Primary Examiner*—Harshad Patel
*Attorney, Agent, or Firm*—Sughrue, Mion, Zinn, Macpeak & Seas, PLLC

[57] ABSTRACT

A flow rate detecting element has a flat substrate 1 provided with a gap opening 18 on at least one side surface, a sensor section 15 including a heating resistance element 4 and a pair of temperature detecting resistance elements 5, 6 arranged on opposite sides of the heating resistance element and wrapped by an insulating supporting film 2 and an insulating protecting film 3 from above and below. The sensor section is arranged on a plane substantially parallel with a surface of the flat substrate and at least one end of the supporting film is held by the flat substrate to locate the sensor section over the gap, whereby the most part of the sensor section is disposed in a non-contact state with the flat substrate. A thin-film-shaped thermal conduction promoting member 11 is provided in a heat transmitting path of the sensor section between the heating resistance element and the pair of temperature detecting resistance elements, and has a higher thermal conductivity than the supporting film and the protecting film.

14 Claims, 13 Drawing Sheets

FLOW RATE DETECTING ELEMENT AND FLOW RATE SENSOR USING SAME

BACKGROUND OF THE INVENTION

1. Field of the Invention

The present invention relates to a flow rate detecting element and a flow rate sensor for measuring an amount of inlet air of an internal combustion engine, for example, and more particularly, to a flow rate detecting element and a flow rate sensor having a heating unit for measuring a flow velocity or a flow rate of a fluid, on the basis of the heat transfer phenomenon to the fluid, from the heating unit or a portion heated by the heating unit.

2. Description of the Related Art

FIGS. 22 and 23 are a sectional view and a plan view, respectively, illustrating a conventional thermosensitive flow rate detecting element disclosed, for example, in Japanese Patent Publication No. H05-7,659.

In FIGS. 22 and 23, an insulating supporting film 2 is formed on a surface of a flat substrate 1. A lattice-shaped heating resistance element 4 is formed on the supporting film 2. Lattice-shaped temperature detecting resistance elements 5 and 6 are formed symmetrically on the supporting film 2 with the heating element 4 in between. Further, an insulating protecting film 3 is formed on the supporting film 2 so as to cover the heating resistance element 4 and the pair of temperature detecting resistance elements 5 and 6. In these drawings, the heating resistance element 4 and the pair of temperature detecting resistance elements 5 and 6, wrapped by the supporting film 2 and the protecting film 3, form a sensor section 14.

An air space 9 is provided below the sensor section 14 of the flat substrate 1. The air space 9 is formed by removing a part of the flat substrate 1 from an opening 8 by means of an etching solution not damaging the supporting film 2 and the protecting film 3. Thus, the sensor section 14 forms a bridge supported by the flat substrate 1 at the both ends thereof, and is in a non-contact state with the flat substrate 1.

A lattice-shaped comparative resistance element 7 is formed on the supporting film 2 at a position far from the sensor section 14, and covered by the protecting film 3.

The flat substrate 1 is made of a semiconductor, and particularly, of silicon which permits application of a highly precise etching technology and gives a high chip productivity. The supporting film 2 and the protecting film 3 are made of silicon nitride which is a very excellent thermal insulator. Further, the heating resistance element 4, the temperature detecting resistance elements 5 and 6 and the comparative resistance element 7 are made of platinum.

In the conventional flow detecting element having the configuration as described above, heating current fed to the heating resistance element 4 is controlled by a control circuit not shown so that temperature of the heating resistance element 4 is kept higher by 200° C. than temperature of the flat substrate 1 detected by the comparative resistance element 7. Because of the presence of the air space 9 below the sensor section 14, heat produced in the heating resistance element 4 is not conducted to the comparative resistance element 7. Temperature detected at the comparative resistance element 7 is therefore substantially equal to the open air temperature.

Heat produced at the heating resistance element 4 is conducted through the supporting film 2 and the protecting film 3 and transmitted to the temperature detecting resistance elements 5 and 6. Further, the heat is transmitted through air surrounding the sensor section 14 to the temperature detecting resistance elements 5 and 6. Since the sensor section 14 is symmetrically configured relative to the center of the heating resistance element 4 as shown in FIG. 23, there is produced no difference in temperature between the pair of temperature detecting resistance elements 5 and 6 in the absence of an air flow. In the presence of an air flow, the temperature detecting resistance element in the upstream is cooled, and the temperature detecting resistance element in the downstream is heated by the heat transmitted by air from the upstream, not cooled so much as the upstream temperature detecting resistance element. When an air flow is produced in the arrow 10 direction in FIG. 23, for example, temperature of the temperature detecting resistance element 6 is higher than that of the temperature detecting resistance element 5. A higher flow velocity leads to a larger difference in temperature between these temperature detecting resistance elements 5 and 6.

Because temperature of the temperature detecting resistance elements 5 and 6 is expressed in terms of a resistance value, the flow velocity can be measured by detecting the difference in resistance value between the temperature detecting resistance elements 5 and 6.

If the air flow direction is counter to the arrow 10 direction, temperature of the temperature detecting resistance element 6 is lower than that of the temperature detecting resistance element 5. Therefore, it is also possible to detect the flow direction of the fluid.

The conventional thermosensitive flow rate detecting element shown in FIGS. 22 and 23 is of the bridge type, and apart from this, the diaphragm type is available as a thermosensitive flow rate detecting element.

A conventional diaphragm type thermosensitive flow rate detecting element is illustrated in FIGS. 24 and 25.

In this diaphragm type thermosensitive flow rate detecting element, a recess 13 is formed by removing a part of the flat substrate 1 by etching or the like from the surface opposite to that having the sensor section 14 formed thereon. The sensor section 14 is held by the flat substrate 1 over the entire periphery thereof to form a diaphragm, in a non-contact state with the flat substrate 1.

This diaphragm type thermosensitive flow rate detecting element, being supported by the flat substrate 1 over the entire periphery, can provide a higher strength, but an inferior response, than a bridge type thermosensitive flow rate detecting element. The principle of detection of the flow velocity of a fluid is the same as in the bridge type.

The conventional thermosensitive flow rate detecting elements have the configuration as described above. When the flow rate or the flow velocity of a measured fluid changes, therefore, there occurs a delay dependent on the thermal conductivity and the heat capacity of the supporting film 2, the protecting film 3, and the individual resistance elements 4, 5 and 6 in temperature of the heating resistance element 4 and the temperature detecting resistance elements 5 and 6. While the heating resistance element 4 is temperature-controlled, the temperature detecting resistance elements 5 and 6 provided on the both sides of the heating resistance element 4 are not temperature-controlled. A period of time is therefore required before a prescribed temperature permitting accurate detection of the flow rate and the flow velocity of the measured fluid after change in temperature.

Therefore, when the flow rate or the flow velocity of a measured fluid continues always to change, temperature of the temperature detecting resistance elements 5 and 6 never accurately represents the instantaneous flow rate or flow velocity. A larger change in flow velocity of the measured fluid per unit time leads to a more difficult detection of an accurate instantaneous flow rate or flow velocity, i.e., to a poorer response as a flow rate detecting element.

Reduction of thickness of the supporting film 2, the protecting film 3 or the resistance element 4, 5 or 6 tends to solve such an inconvenience. This however causes a serious decrease in strength of the sensor section 14 of the bridge structure or the diaphragm structure, and hence poses a problem of a lower reliability as a flow rate detecting element.

For example, when measuring the amount of inlet air of an internal combustion engine, the amount of inlet air becomes a pulsation flow responding to the number of revolutions, which results in a very large range of fluctuation of flow rate in a high-load region and a high speed of fluctuation of flow rate in a high rotation region. A highly responsive flow rate detecting element is therefore demanded. Further, since the maximum flow velocity of inlet air almost reaches 200 m/s, a flow rate detecting element having a prescribed strength is required.

In the conventional thermosensitive flow rate detecting element, as described above, improvement of response requires a decrease in strength, and this poses the problem of very difficult design of an element suitable for measurement of the amount of inlet air of an internal combustion engine.

SUMMARY OF THE INVENTION

The present invention was developed to solve the problems as described above, and has an object to provide a flow rate detecting element and a flow rate sensor using the same, which permits improvement of response without reducing the thickness of a supporting film or a protecting film, i.e., without decreasing strength.

In order to achieve the above object, according to one aspect of the invention, there is provided a flow rate detecting element comprising a flat substrate provided with a gap opening on at least one side surface thereof; a sensor section which a heating resistance element and a pair of temperature detecting resistance elements arranged on the both sides of the heating resistance element are wrapped by an insulating supporting film and an insulating protecting film from above and below, wherein the sensor section is arranged on a plane substantially in parallel with a surface of the flat substrate and at least one end of the supporting film is held by the flat substrate so as to be located the sensor section on the gap, whereby most part of the sensor section being arranged in a non-contact state with the flat substrate; and a thin-film-shaped thermal conduction promoting member provided on a heat transmitting path of the sensor section between the heating resistance element and the pair of temperature detecting resistance elements and having a higher thermal conductivity than at least any of the supporting film and the protecting film.

According to another aspect of the present invention, there is provided a flow rate sensor comprising a measuring conduit having a cylindrical shape and arranged in a path of a measured fluid with an axial direction thereof substantially agreeing with the flow direction of the measured fluid; a flow rate detecting element having a flat substrate provided with a gap opening on at least one side surface thereof, a sensor section which a heating resistance element and a pair of temperature detecting resistance elements arranged on the both sides of the heating resistance element are wrapped by an insulating supporting film and an insulating protecting film from above and below, wherein the sensor section is arranged on a plane substantially in parallel with a surface of the flat substrate and at least one end of the supporting film is held by the flat substrate so as to be located the sensor section on the gap, whereby most part of the sensor section being arranged in a non-contact state with the flat substrate, and a thin-film-shaped thermal conduction promoting member provided on a heat transmitting path of the sensor section between the heating resistance element and the pair of temperature detecting resistance elements and having a higher thermal conductivity than at least any of the supporting film and the protecting film; a control section which holds the heating resistance element at a prescribed temperature by controlling power fed to the heating resistance element; and a temperature measuring section which measures temperature of the pair of temperature detecting resistance elements.

DETAILED DESCRIPTION OF THE PREFERRED EMBODIMENTS

Now, embodiment of the present invention will be described.

First Embodiment

Figure 1:
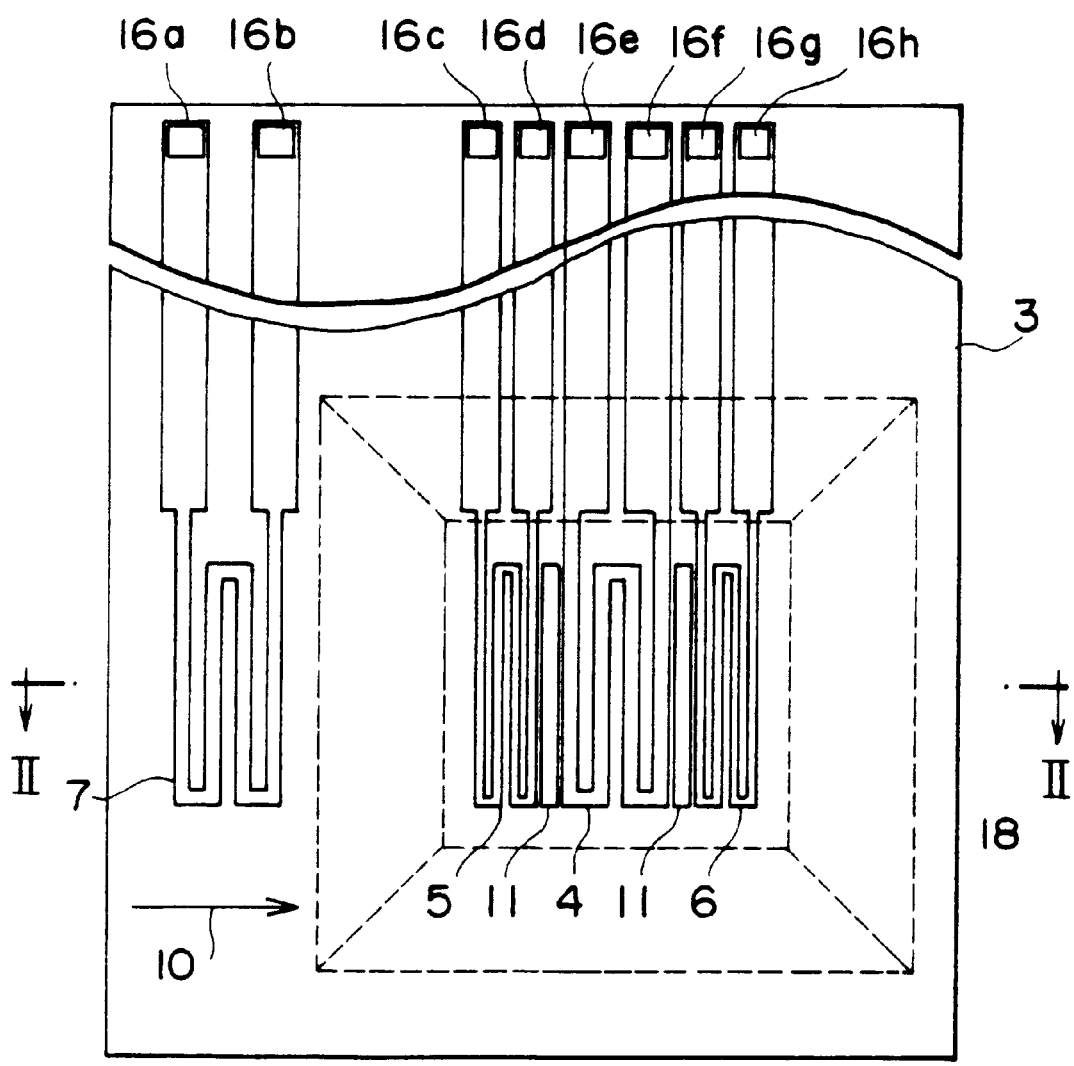
FIG. 1 is a plan view illustrating a flow rate detecting element of a first embodiment of the invention.
Figure 2:
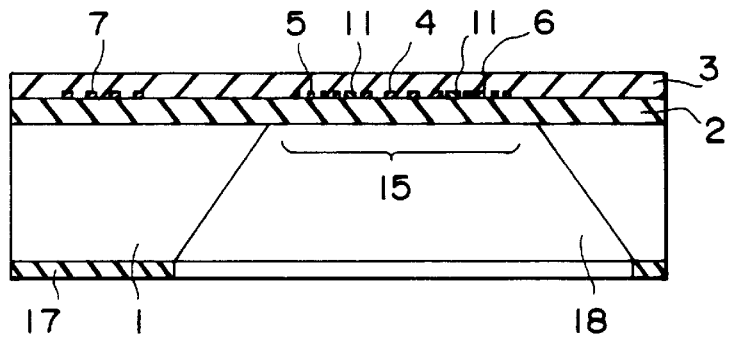
FIG. 2 is a sectional view of FIG. 1 cut along the line II—II.

FIG. 1 is a plan view illustrating a flow rate detecting element of a first embodiment of the invention; and FIG. 2 is a sectional view of FIG. 1 cut along the line II—II.

In FIGS. 1 and 2, an insulating supporting film 2 is formed on the surface of a flat substrate 1, and a lattice-shaped heating resistance element 4 is formed on the supporting film 2. Lattice-shaped temperature detecting resistance elements 5 and 6 are formed on the supporting film 2 so as to be located on the both sides of the heating resistance element 4. Further, thermal conduction promoting members 11 are formed between the heating resistance element 4 and the pair of temperature detecting resistance elements 5 and 6, respectively. An insulating protecting film 3 is formed on the supporting film 2 so as to cover the heating resistance element 4, the pair of temperature detecting resistance elements 5 and 6, and the pair of thermal conduction promoting members 11. The heating resistance element 4, the pair of temperature detecting resistance elements 5 and 6 and the pair of thermal conduction promoting members 11, as wrapped by the supporting film 2 and the protecting film 3, form a sensor section 15. The sensor section 15 is formed symmetrically relative to the center of the heating resistance element 4.

An etching hole 18 serving as a gap is provided below the sensor section 15 of the flat substrate 1. The etching hole 18 is formed by applying alkali etching with a back protecting film 17 formed on the back of the flat substrate 1 as a mask, and thus removing a part of the flat substrate 1. The sensor section 15, supported by the flat substrate 1 over the entire periphery thereof, forms a diaphragm, and is in a non-contact state with the flat substrate 1.

A lattice-shaped comparative resistance element 7 is formed on the supporting film 2 at a position far from the sensor section 15, and is covered by the protecting film 3 from above. Lead sections extend from ends of lattice patterns of the comparative resistance element 7, the heating resistance element 4 and the pair of temperature detecting resistance elements 5 and 6, respectively, and the individual lead sections, of which the protecting film 3 is removed at ends, form electrode pads 16a to 16h.

The flat substrate 1 is made of a semiconductor, and particularly, of silicon which permits application of a highly precise etching technology and ensures a high chip productivity. The supporting film 2 and the protecting film 3 are made of silicon nitride which is a very excellent thermal insulator. The heating resistance element 4, the temperature detecting resistance elements 5 and 6, and the comparative resistance element 7 are made of platinum. The thermal conduction promoting member 11 is made of platinum having a higher thermal conductivity than the supporting film 2 and the protecting film 3.

Preparation of this flow rate detecting element comprises the steps of first forming a 2 μm-thick film of silicon nitride by sputtering to the both entire surface of the flat substrate 1 made of silicon, thereby forming the supporting film 2 and the back protecting film 17. Then, the subsequent steps comprise forming a 0.1 μm-thick platinum film by sputtering on the entire surface of the supporting film 2, patterning the platinum film by the photolithographing and etching techniques, thereby forming a lattice shaped heating resistance element 4, temperature detecting resistance elements 5 and 6 and a comparative resistance element 7 having a pattern width of 5 μm and a pattern interval of 5 μm, and rectangular thermal conduction promoting members 11 between the heating resistance element 4 and the temperature detecting resistance elements 5 and 6. Further, a 2 μm-thick silicon nitride film is formed on the entire surface of the supporting film 2 to form a protecting film 3. Subsequently, the protecting film 3 is removed from ends of the lead sections of the heating resistance element 4, the temperature detecting resistance elements 5 and 6, and the comparative resistance element 7 by the application of the photolithographing and the etching techniques to form electrode pads 16a to 16h.

A part of the back protecting film 17 is removed by the photolithographing and etching techniques to form a rectangular opening faced on the sensor section 15. Then, the flat substrate 1 is etched from this opening to form an etching hole 18, thus providing a flow rate detecting element shown in FIGS. 1 and 2.

In the flow rate detecting element configured as described above, heating current fed to the heating resistance element 4 is controlled by a control circuit not shown so that temperature of the heating resistance element 4 is kept higher by, for example, 200° C. than temperature of the flat substrate 1 detected by the comparative resistance element 7. Because of the presence of the etching hole 18 below the sensor section 15, heat produced at the heating resistance element 4 is not transmitted to the comparative resistance element 7. Temperature detected by the comparative resistance element 7 thus becomes substantially equal to the air temperature. A higher flow velocity of a measured fluid flowing on the protecting film 4 side leads to a change in the temperature distribution comprising a lower temperature in the upstream, and a higher temperature in the downstream.

Figure 3:
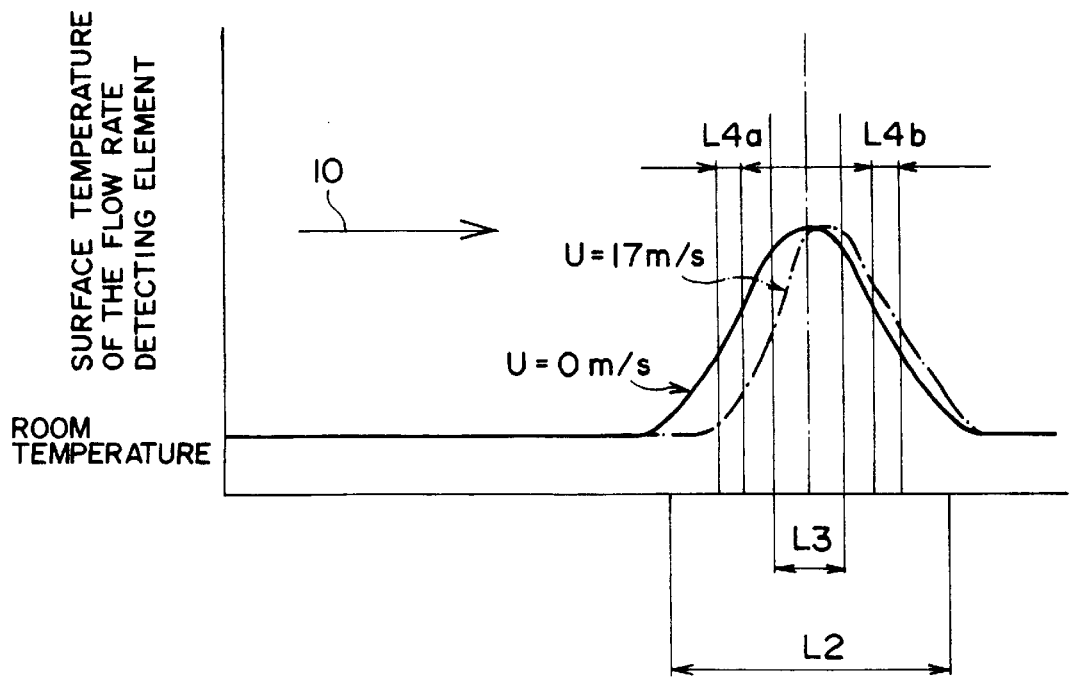
FIG. 3 is a graph illustrating a surface temperature distribution of the flow rate detecting element in the flow direction of a measured fluid.

A surface temperature distribution of the flow rate detecting element in the II—II direction in FIG. 1 is shown in FIG. 3. The flow direction 10 of air (measured fluid) agrees with the II—II direction. In FIG. 3, the temperature distribution at an air flow velocity of 0 m/s is represented by a solid line, and that at an air flow velocity of 17 m/s is represented by a one-point chain line. L2 indicates the width in the II—II direction of the diaphragm section; L3 represents the width of the heating resistance element 4 in the II—II direction; L4a, the width of the temperature detecting resistance element 5 in the II—II direction; and L4b, the width of the temperature detecting resistance element 6 in the II—II direction.

FIG. 3 suggests that, in the presence of an air flow, the surface temperature distribution of the flow rate detecting element moves in the air flow direction, and the average temperature of the temperature detecting resistance element 5 becomes lower than the average temperature of the temperature detecting resistance element 6.

A certain voltage is previously applied to each of the temperature detecting resistance elements 5 and 6 through electrode pads 16c, 16d, 16g and 16h by means of a circuit (not shown), and current values of current flowing to the temperature detecting resistance elements 5 and 6 are measured, respectively. The flow direction, flow rate or flow velocity of air can thus be measured by comparing these current values. Quantities corresponding to temperature of the temperature detecting resistance elements 5 and 6, respectively, are measured by a method comprising previously feeding a certain current to each of the temperature detecting resistance elements 5 and 6, and measuring voltage between the electrode pads 16c and 16d and between the electrode pads 16g and 16h, or by a method comprising measuring power consumption of each of the temperature detecting resistance elements 5 and 6. It is possible to measure the flow direction, flow rate or flow velocity of air by comparing these quantities.

In the first embodiment, the thermal conduction promoting members 11 are arranged between the heating resistance element 4 and the temperature detecting resistance elements 5 and 6. The thermal conduction promoting member 11 is made of platinum, and has a very large thermal conductivity as compared with the supporting film 2 and the protecting film 3 made of silicon nitride, hence having a very strong thermal combination with the heating resistance element 4 and the temperature detecting resistance elements 5 and 6.

Thermal conduction in this flow rate detecting element takes place as follows. Heat produced at the heating resistance element 4 is transmitted to the supporting film 2 and the protecting film 3 on and under the heat resistance element 4, then transmitted in the II—II direction in the films, and then transmitted to the thermal conduction promoting members 11 from ends of the thermal conduction promoting member 11 on the side of the heating resistance element 4. The heat transmitted to the thermal conduction promoting members 11 is then transmitted from ends of the thermal conduction promoting members 11 on the side of the temperature detecting resistance elements 5 and 6 to the supporting film 2 and the protecting film 3, then transmitted in the II—II direction in the films, and transmitted from ends of the temperature detecting resistance elements 5 and 6 on the side of the thermal conduction promoting members 11 to the temperature detecting resistance elements 5 and 6.

In a flow rate detecting element in which thermal conduction promoting member 11 are omitted, on the other hand, thermal conduction is accomplished as follows. Heat produced at the heating resistance element 4 is transmitted to the supporting film 2 and the protecting film 3 on and under the heating resistance element 4, transmitted in the II—II direction in the films, and transmitted to the temperature detecting resistance elements 5 and 6.

Since the heating resistance element 4 and the temperature detecting resistance elements 5 and 6 are formed with a pattern width of 5 $\mu$m and a pattern intervals of 5 $\mu$m, the distance (L4a) between the center of the heating resistance element 4 on the temperature detecting resistance element 5 side and the center of the temperature detecting resistance element 5, and the distance (L4b) between the center of the heating resistance element 4 on the temperature detecting resistance element 6 side and the center of the temperature detecting resistance element 6 are 50 $\mu$m, respectively. In the absence of the thermal conduction promoting member 11, the heat is transmitted over a distance of 50 $\mu$m in the II—II direction in the films hardly permitting heat conduction, because of the small thermal conductivity of the supporting film 2 and the protecting film 3. In the presence of the thermal conduction promoting members 11, however, which have a large thermal conductivity, the heat is transmitted rapidly in the II—II direction through the thermal conduction promoting members 11. In the flow rate detecting element of the first embodiment, it is possible to reduce the length of a heat transmitting path hardly permitting heat conduction, i.e., the length of the heat transmitting path through the supporting film 2 and the protecting film 3. In the flow rate detecting element of the first embodiment, therefore, thermal resistance between the heating resistance element 4 and the temperature detecting resistance elements 5 and 6 is considerably smaller than that in the conventional flow rate detecting element.

According to the first embodiment, as described above, the thermal conduction promoting members 11 having a larger thermal conductivity than that of the supporting film 2 and the protecting film 3 are arranged between the heating resistance element 4 and the temperature detecting resistance elements 5 and 6. It is therefore possible to reduce thermal resistance between the heating resistance element 4 and the temperature detecting resistance elements 5 and 6, and heat produced at the heating resistance element 4 is rapidly transmitted to the temperature detecting resistance elements 5 and 6. Even upon sudden change in the flow rate or the flow velocity of the measured fluid, therefore, a surface temperature distribution of the sensor section 15 having moved in the flow direction is rapidly formed, thus giving a highly responsive flow rate detecting element.

Because the thickness of the sensor section 15, i.e., the thickness of the diaphragm section, is designed to be the same as that in the conventional flow rate detecting element, there is available a responsive flow rate detecting element having the same strength as that of the conventional flow rate detecting element. In other words, a flow rate detecting element having the same response and a high strength as in the conventional flow rate detecting element is available by designing the diaphragm into a thickness larger than that of the conventional flow rate detecting element.

In the first embodiment, as described above, the thermal conduction promoting member 11 is made of a material having a higher thermal conductivity than the supporting film 2 and the protecting film 3. When different materials are used for the supporting film 2 and the protecting film 3, response can be improved by using a material having a higher thermal conductivity than at least any of the supporting film 2 and the protecting film 3 for the thermal conduction promoting member 11.

Second Embodiment

Figure 4:
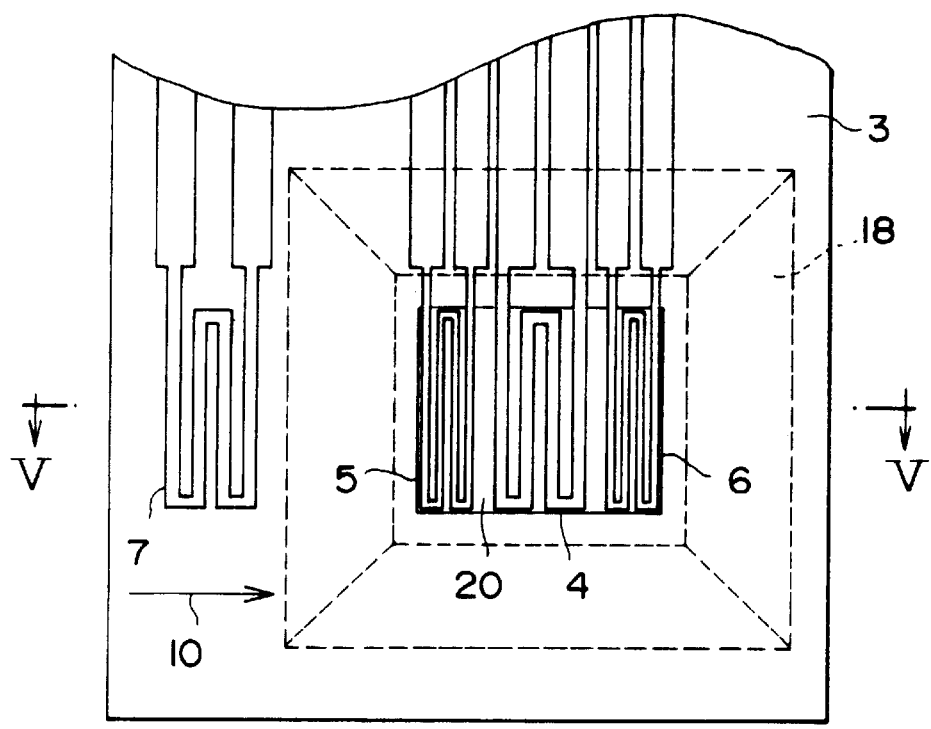
FIG. 4 plan view illustrating a flow rate detecting element of a second embodiment of the invention.
Figure 5:
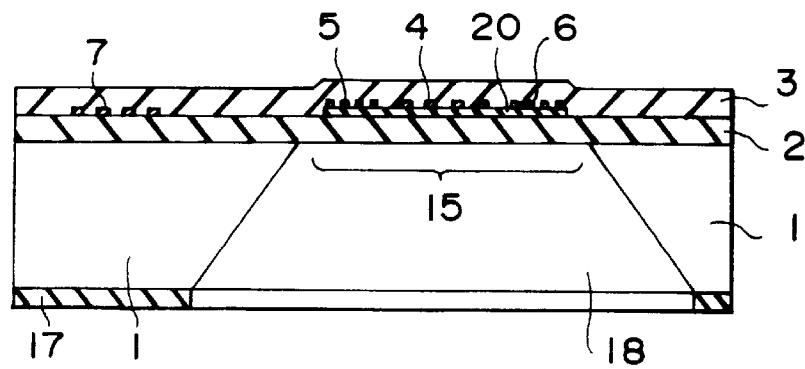
FIG. 5 is a sectional view of FIG. 4 cut along the line V—V.

FIG. 4 is a plan view illustrating a flow rate detecting element of a second embodiment of the invention; and FIG. 5 is a sectional view of FIG. 4 cut along the line V—V.

In this second embodiment, a thermal conduction promoting member 20 is formed into a rectangular shape on a supporting film 2 so as to cover the arrangement region of a heating resistance element 4 and temperature detecting resistance elements 5 and 6. The heating resistance element 4 and the temperature detecting resistance elements 5 and 6 are formed on the thermal conduction promoting member 20 so that a protecting film 3 covers the heating resistance element 4 and the temperature detecting resistance elements 5 and 6. The thermal conduction promoting member 20 is made of an insulating material having a higher thermal conductivity than that of the supporting film 2 such as aluminum oxide ($Al_2O_3$).

The second embodiment has the same configuration as in the foregoing first embodiment except that, in place of the thermal conduction promoting members 11, the thermal conduction promoting member 20 is arranged between the heating resistance element 4 and the temperature detecting resistance elements 5 and 6, on the one hand, and the supporting film 2, on the other hand.

In the flow rate detecting element having the configuration as described above, thermal conduction is accomplished as follows. Heat produced at the heating resistance element 4 is transmitted to the thermal conduction promoting member 20 and the protecting film 3 on and under the heating resistance element 4, and after transmission through the films in the V—V direction, transmitted to the temperature detecting resistance elements 5 and 6.

Because thermal conduction on the lower surface side of the sensor section 15 takes place through the thermally conductive thermal conduction promoting member 20 having the higher thermal conductivity than that of the supporting film 2, heat resistance between the heating resistance element 4 and the temperature detecting resistance elements 5 and 6 becomes smaller than in the conventional flow rate detecting element.

According to the second embodiment, as described above, the thermal conduction promoting member 20 having a larger thermal conductivity than that of the supporting film 2 is arranged between the heating resistance element 4 and the temperature detecting resistance elements 5 and 6, on the one hand, and the supporting film 2, on the other hand. It is therefore possible to reduce heat resistance between the heating resistance element 4 and the temperature detecting resistance elements 5 and 6, thus permitting rapid transmission of the heat produced at the heating resistance element 4 to the temperature detecting resistance elements 5 and 6. Even upon sudden change in the flow rate or the flow velocity of the measured fluid, therefore, a surface temperature distribution of the sensor section 15 having moved in the flow direction is rapidly formed, and a responsive flow rate detecting element is available.

Third Embodiment

Figure 6:
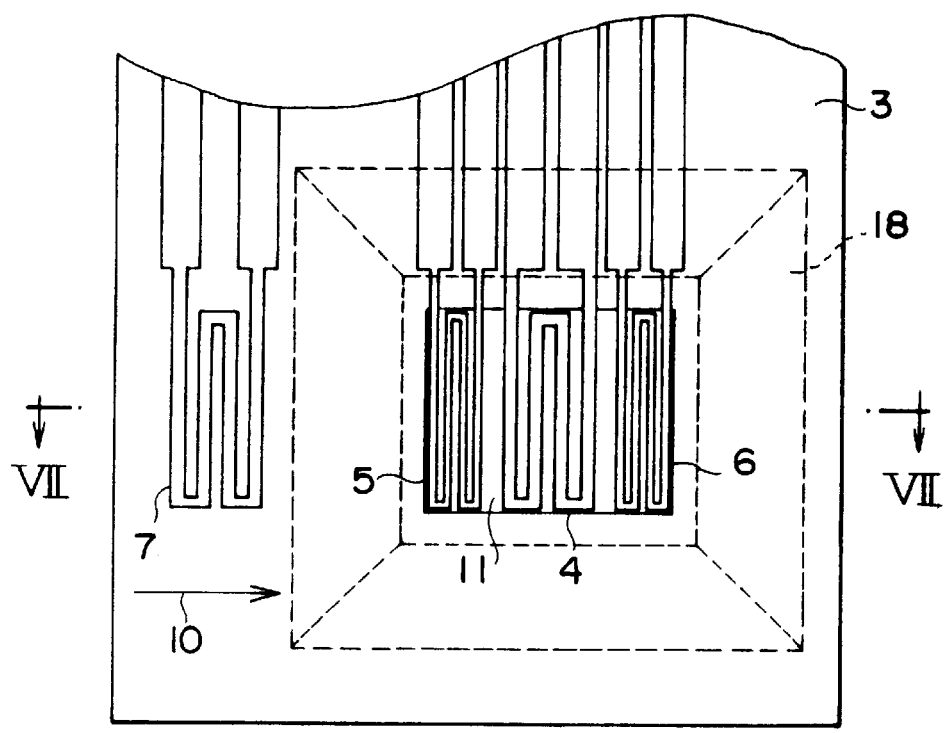
FIG. 6 is a plan view illustrating a flow rate detecting element of a third embodiment of the invention.
Figure 7:
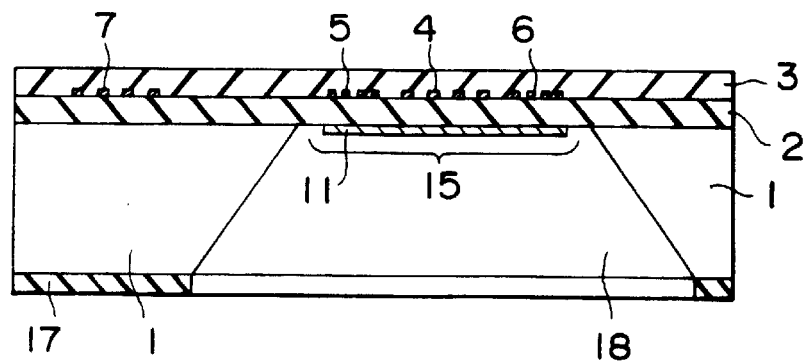
FIG. 7 is a sectional view of FIG. 6 cut along the line VII—VII.

FIG. 6 is a plan view illustrating a flow rate detecting element of a third embodiment of the invention; and FIG. 7 is a sectional view of FIG. 6 cut along the line VII—VII.

In the third embodiment, a thermal conduction promoting member 11 is formed into a rectangular shape so as to cover the arrangement region of a heating resistance element 4 and temperature detecting resistance elements 5 and 6 on the lower surface of the supporting film 2.

The third embodiment has the same configuration as in the foregoing first embodiment except that the thermal conduction promoting member 11 is arranged on the lower surface of the supporting film 2.

In the flow rate detecting element having the configuration as described above, thermal conduction is accomplished as follows. Heat produced at the heating resistance element 4 is transmitted to the supporting film 2 and the protecting film 3 on and under the heating resistance element 4. Then, the heat transmitted to the protecting film 3 is transmitted through the film in the VII—VII direction to the temperature detecting resistance elements 5 and 6. The heat transmitted to the supporting film 2 is on the other hand transmitted to the thermal conduction promoting member 11, transmitted through the film in the VII—VII direction again to the supporting film 2, and then transmitted to the temperature detecting resistance elements 5 and 6.

Because the supporting film 2 hardly permits heat conduction but is formed into a very small thickness, heat is rapidly conducted in the thickness direction. Heat conduction on the lower surface side of the sensor section 15 is accomplished through the thermal conduction promoting member 11 having a higher thermal conductivity than the supporting film 2. It is therefore possible to reduce heat resistance between the heating resistance element 4 and the temperature detecting resistance elements 5 and 6 as compared with the conventional flow rate detecting element.

According to the third embodiment, as described above, the thermal conduction promoting member 11 having a higher thermal conductivity than that of the supporting film 2 is arranged on the lower surface of the supporting film 2. It is thus possible to reduce heat resistance between the heating resistance element 4 and the temperature detecting resistance elements 5 and 6, and the heat produced at the heating resistance element 4 is rapidly transmitted to the temperature detecting resistance elements 5 and 6. Even upon sudden change in the flow rate or the flow velocity of the measured fluid, therefore, a surface temperature distribution of the sensor section 15 having moved in the flow direction is rapidly formed, and a highly responsive flow rate detecting element is available.

Fourth Embodiment

Figure 8:
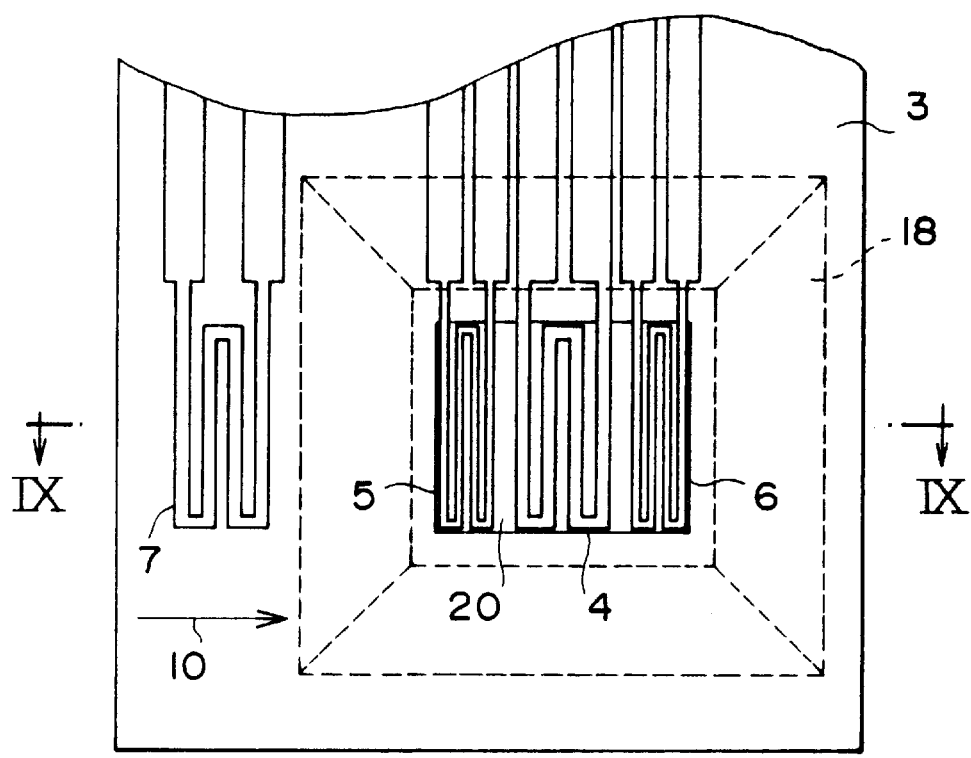
FIG. 8 is a plan view illustrating a flow rate detecting element of a fourth embodiment of the invention.
Figure 9:
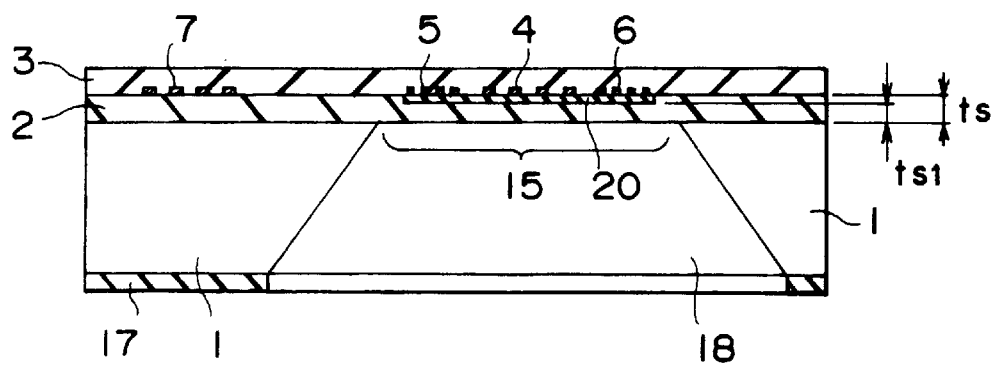
FIG. 9 is a sectional view of FIG. 8 cut along the line IX—IX.

FIG. 8 is a plan view illustrating a flow rate detecting element of a fourth embodiment of the invention; and FIG. 9 is a sectional view of FIG. 8 cut along the line IX—IX.

In the fourth embodiment, a thermal conduction promoting member 20 is embedded in a supporting film 2 and is formed into a rectangular shape so as to cover the arrangement region of a heating resistance element 4 and temperature detecting resistance elements 5 and 6, and to be located at the same plane position as the upper surface of the supporting film 2.

The fourth embodiment has the same configuration as in the foregoing second embodiment except that the thermal conduction promoting member 20 is embedded in on the upper surface side of the supporting film 2, and arranged between the heating resistance element 4 and the temperature detecting resistance elements 5 and 6, on the one hand, and the supporting film 2, on the other hand.

Preparation of the thermal conduction promoting member 20 embedded in the supporting film 2 comprises the steps of first forming a ts1-thick film of silicon nitride on the upper surface of a flat substrate 1, forming another (ts-ts1)-thick film of aluminum oxide on the silicon nitride film, etching the aluminum oxide film into a rectangular shape by the application of the photolithographing and etching techniques, thereby forming a thermal conduction promoting member 20, then, in a state in which a photoresist serving as a mask for etching the aluminum oxide film is left, forming a (ts-ts1)-thick film of silicon nitride, and then removing the photoresist, thereby forming the thermal conduction promoting member 20 so as to be embedded at the same plane position in the supporting film 2 having a thickness of ts.

In the flow rate detecting element having the configuration as described above, as in the foregoing second embodiment, heat produced at the heating resistance element 4 is transmitted to the thermal conduction promoting member 20 and the protecting film 3 on and under the heating resistance element 4, and after transmission through the films in the IX—IX direction, transmitted to the temperature detecting resistance elements 5 and 6.

Also in this fourth embodiment, as in the foregoing second embodiment, even upon sudden change in the flow rate or the flow velocity of the measured fluid, a surface temperature distribution of the sensor section 15 having moved in the flow direction is rapidly formed, and a responsive flow rate detecting element is available.

In the fourth embodiment, furthermore, in which the thermal conduction promoting member 20 is at the same plane position as the supporting film 2, no surface irregularities occur on the sensor section 15. As compared with the aforesaid second embodiment, disturbance of the flow of air flowing on the surface of the sensor section 15 is inhibited, and a high response is available while achieving stable properties.

Thermal conduction and heat capacity contribute to the conduction of heat. In the fourth embodiment, in which the thermal conduction promoting member 20 is embedded in the supporting film 2, the thermal conduction promoting member 20 can be provided without increasing the thickness of the supporting film 2. Because the thickness ts of the supporting film 2 is maintained, it is possible to inhibit increase in the heat capacity by providing the thermal conduction promoting member 20, thus permitting improvement of response.

Fifth Embodiment

Figure 10:
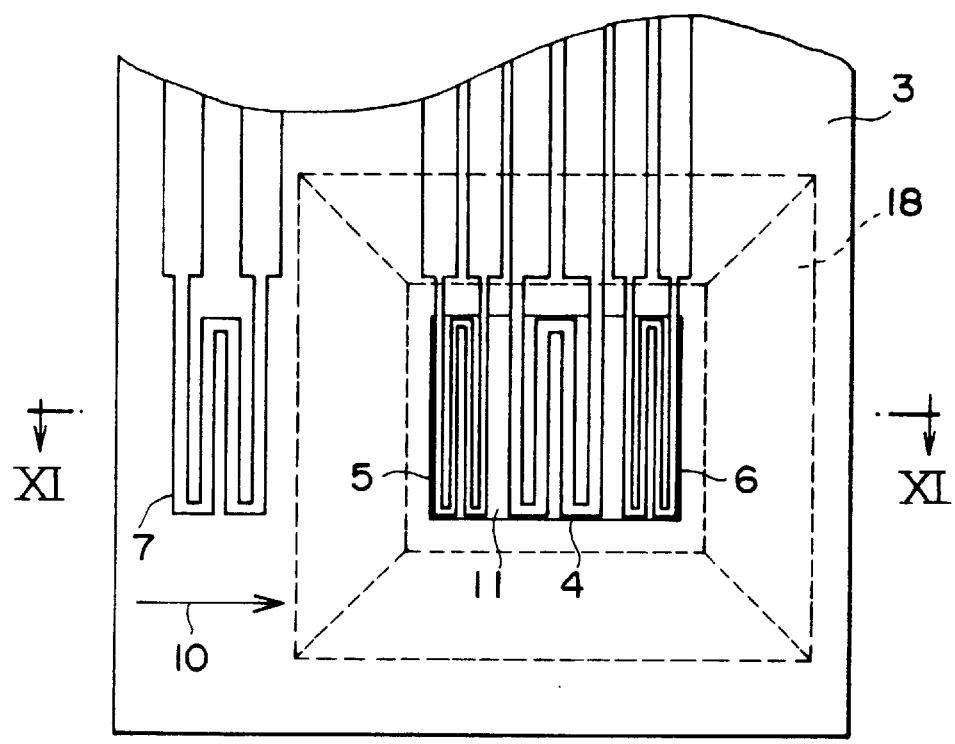
FIG. 10 is a plan view illustrating a flow rate detecting element of a fifth embodiment of the invention.
Figure 11:
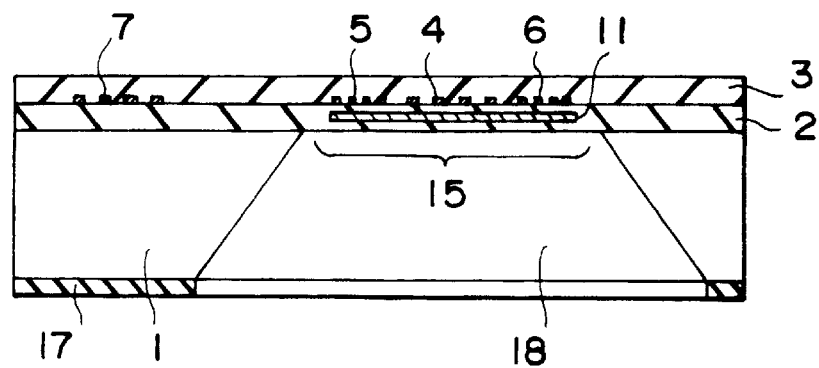
FIG. 11 is a sectional view of FIG. 10 cut along the line XI—XI.

FIG. 10 is a plan view illustrating a flow rate detecting element of a fifth embodiment of the invention; and FIG. 11 is a sectional view of FIG. 10 cut along the line XI—XI.

In the fifth embodiment, a thermal conduction promoting member 11 is embedded in a supporting film 2 and formed into a rectangular shape so as to cover the arrangement region of a heating resistance element 4 and temperature detecting resistance elements 5 and 6.

The fifth embodiment has the same configuration as in the foregoing third embodiment except that the thermal conduction promoting member 11 is embedded in the supporting film 2.

Preparation of the thermal conduction promoting member 11 comprises the steps of first forming a silicon nitride film on the upper surface of a flat substrate 1, forming a platinum film on the silicon nitride film, then etching the platinum film into a rectangular shape, thereby forming a thermal conduction promoting member 11, then, in a state leaving a photoresist serving as a mask for etching the platinum film, forming a silicon nitride film into the same thickness as the platinum film, removing the photoresist so that the platinum film and the silicon nitride film forming the thermal conduction promoting member 11 are at the same plane position, and a further silicon nitride film is formed thereon, thereby forming the thermal conduction promoting member 11 embedded in the supporting film 2.

While the supporting film 2 is formed by laminating three layers of silicon nitride film, the thickness of the individual layers of silicon nitride film is controlled so as not to result in an increased total thickness.

In the flow rate detecting element having the configuration as described above, as in the foregoing third embodiment, heat produced at the heating resistance element 4 is transmitted to the supporting film 2 and the protecting film 3 on and under the heating resistance element 4. The heat transmitted to the protecting film 3 is transmitted in the XI—XI direction through the film, and then transmitted to the temperature detecting resistance elements 5 and 6. The heat transmitted to the supporting film 2 is on the other hand transmitted to the thermal conduction promoting member 11, transmitted in the XI—XI direction through the film, transmitted again to the supporting film 2, and then transmitted to the temperature detecting resistance elements 5 and 6.

Also in the fifth embodiment, as in the foregoing third embodiment, even upon sudden change in the flow rate or flow velocity of the measure fluid, a surface temperature distribution of the sensor section 15 having moved in the flow direction is rapidly formed, and a highly responsive flow rate detecting element is available.

In the fifth embodiment, in which the thermal conduction promoting member 11 is embedded in the supporting film 2, there occur no surface irregularities on the sensor section 15. As compared with the aforesaid third embodiment, therefore, disturbance of the flow of air flowing on the surface of the sensor section 15 is inhibited, and a high response is available while stabilizing properties.

Because the thermal conduction promoting member 11 is embedded in the supporting film 2, the distance from the heating resistance element 4 and the temperature detecting resistance element 5 and 6 to the thermal conduction promoting member 11 is shortened, and thermal conduction is promoted through the supporting film 2 between the heating resistance element 4 and the temperature detecting resistance elements 5 and 6, on the one hand, and the thermal conduction promoting member 11, on the other hand, and response is improved so much.

Thermal conduction and heat capacity contribute to the conduction of heat. In the fifth embodiment, in which the thermal conduction promoting member 11 is embedded in the supporting film 2, the thermal conduction promoting member 11 can be provided without increasing the thickness of the supporting film 2. Because the thickness of the supporting film 2 is maintained, it is possible to inhibit increase in the heat capacity caused by providing the thermal conduction promoting member 11, thus permitting improvement of response.

Sixth Embodiment

Figure 12:
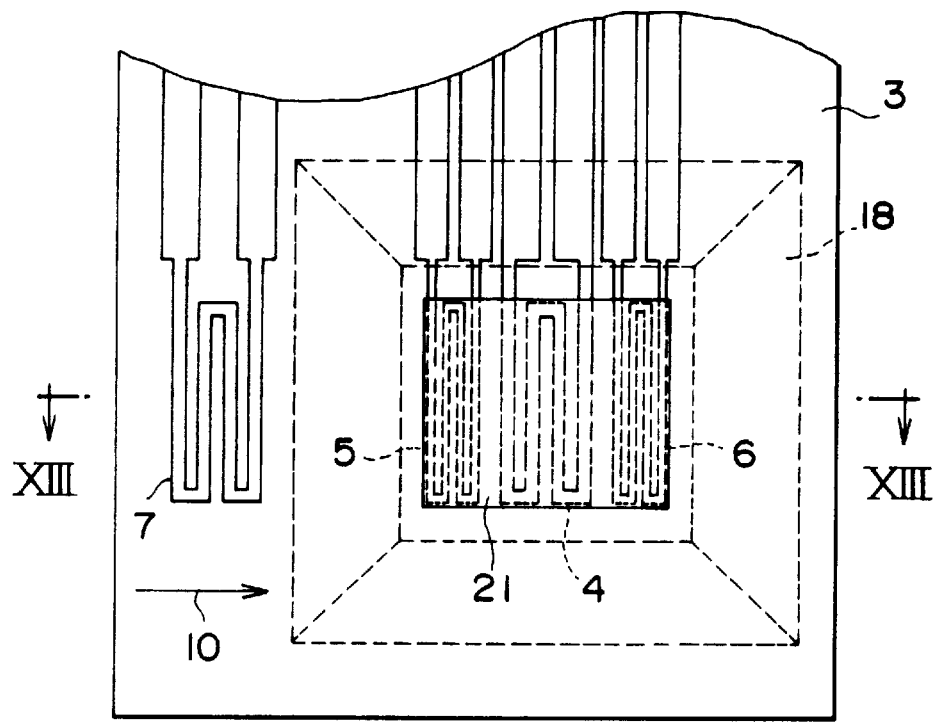
FIG. 12 is a plan view illustrating a flow rate detecting element of a sixth embodiment of the invention.
Figure 13:
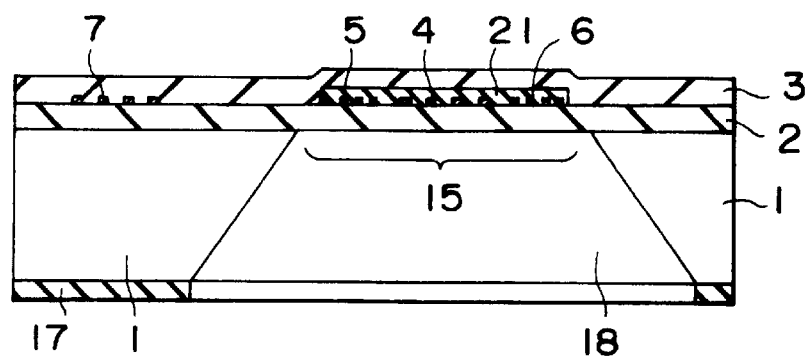
FIG. 13 is a sectional view of FIG. 12 cut along the line XIII—XIII.

FIG. 12 is a plan view illustrating a flow rate detecting element of a sixth embodiment of the invention; and FIG. 13 is a sectional view of FIG. 12 cut along the line XIII—XIII.

In the sixth embodiment, a thermal conduction promoting member 21 is formed into a rectangular shape on a supporting film 2 so as to cover a heating resistance element 4 and temperature detecting resistance elements 5 and 6, and a protecting film 3 is formed on the supporting film 2 so as to cover the thermal conduction promoting member 21. The thermal conduction promoting member 21 is made of an insulating material having a higher thermal conductivity than the protecting film 3, such as aluminum oxide.

The sixth embodiment has the same configuration as that of the foregoing first embodiment except that, in place of the thermal conduction promoting members 11, the thermal conduction promoting member 21 is arranged between the heating resistance element 4 and the temperature detecting resistance elements 5 and 6, on the one hand, and the protecting film 3, on the other hand.

Preparation of the thermal conduction promoting member 21 comprises the steps of first forming an aluminum oxide film on the flat substrate 1 having the supporting film 2, the heating resistance element 4, the temperature detecting resistance elements 5 and 6, and a comparative resistance film 7 formed thereon, and etching the aluminum oxide film into a rectangular shape by the use of the photolithographing and etching techniques, thereby forming the thermal conduction promoting member 21 covering the heating resistance element 4 and the temperature detecting resistance elements 5 and 6.

In the flow rate detecting element having the configuration as described above, thermal conduction is accomplished as follows. Heat produced at the heating resistance element 4 is transmitted to the supporting film 2 and the thermal conduction promoting member 21 on and under the heating resistance element 4, then transmitted in the XIII—XIII direction through the films, and transmitted to the temperature detecting resistance elements 5 and 6.

Since thermal conduction on the upper surface side of the sensor section 15 is conducted through the thermal conduction promoting member 21 having a higher thermal conductivity than the protecting film 3, the heat resistance between the heating resistance element 4 and the temperature detecting resistance elements 5 and 6 becomes smaller than in the conventional flow rate detecting element.

According to the sixth embodiment, as described above, the thermal conduction promoting member 21 having a higher thermal conductivity than that of the protecting film 3 is arranged between the heating resistance element 4 and the temperature detecting resistance elements 5 and 6. It is therefore possible to reduce heat resistance between the heating resistance element 4 and the temperature detecting resistance elements 5 and 6, so that the heat produced at the heating resistance element 4 is rapidly transmitted to the temperature detecting resistance elements 5 and 6. Even upon change in the flow rate or the flow velocity of the measured fluid, therefore, a surface temperature distribution of the sensor section 15 having moved in the flow direction is rapidly formed, and there is available a responsive flow rate detecting element.

Seventh Embodiment

Figure 14:
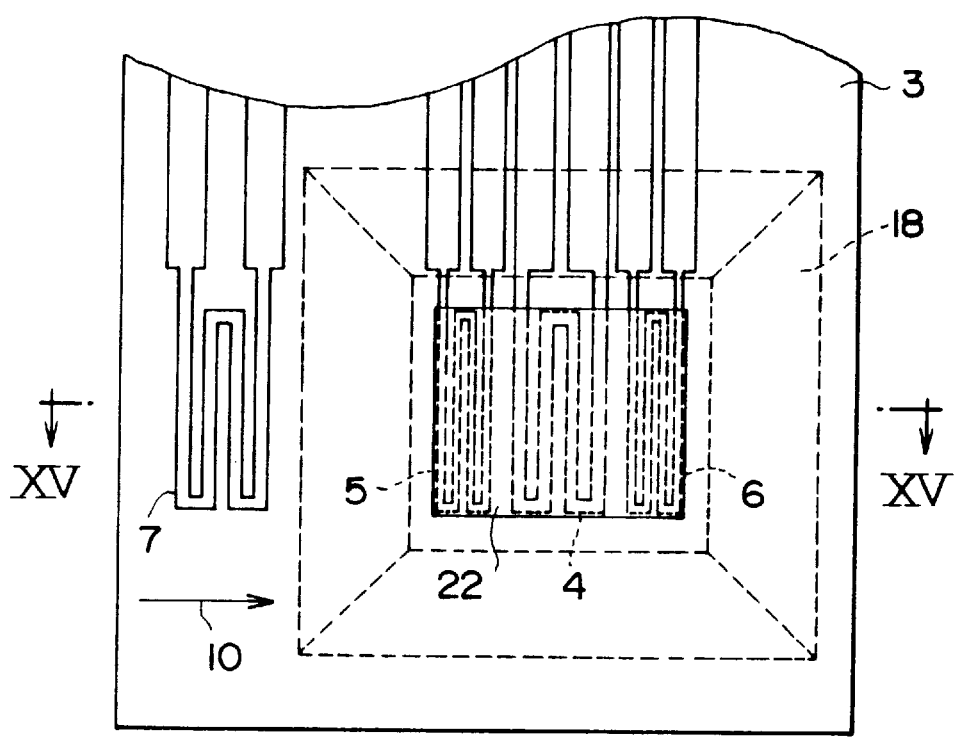
FIG. 14 is a plan view illustrating a flow rate detecting element of a seventh embodiment of the invention.
Figure 15:
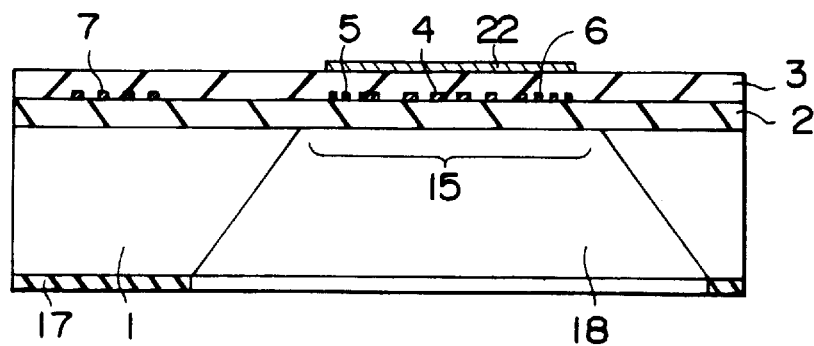
FIG. 15 is a sectional view of FIG. 14 cut along the line XV—XV.

FIG. 14 is a plan view illustrating a flow rate detecting element of a seventh embodiment of the invention; and FIG. 15 is a sectional view of FIG. 14 cut along the line XV—XV.

In the seventh embodiment, a thermal conduction promoting member 22 is formed into a rectangular shape on a protecting film 3 so as to cover the arrangement region of a heating resistance element 4 and temperature detecting resistance elements 5 and 6. The thermal conduction promoting member 22 is made of a material having a higher thermal conductivity than that of the protecting film 3, such as platinum.

The seventh embodiment has the same configuration as in the foregoing first embodiment except that, in place of the thermal conduction promoting members 11, a thermal conduction promoting member 22 is arranged on a protecting film 3 so as to cover the arrangement region of a heating resistance element 4 and temperature detecting resistance elements 5 and 6.

In the flow rate detecting element having the configuration as described above, thermal conduction is accomplished as follows. Heat produced at the heating resistance element 4 is transmitted to a supporting film 2 and the protecting film 3 on and under the heating resistance element 4. The heat transmitted to the supporting film 2 is transmitted in the XV—XV direction through the films, and then transmitted to the temperature detecting resistance elements 5 and 6. The heat transmitted to the protecting film 3 is on the other hand transmitted to the thermal conduction promoting member 22, transmitted in the XV—XV direction through the film, then transmitted again to the protecting film 3, and to the temperature detecting resistance elements 5 and 6.

Because the protecting film 3 hardly permits heat conduction but is formed into a very small thickness, heat is rapidly conducted in the thickness direction. Heat conduction on the upper surface side of the sensor section 15 is accomplished through the thermal conduction promoting member 22 having a higher thermal conductivity than the protecting film 3. It is therefore possible to reduce heat resistance between the heating resistance element 4 and the temperature detecting resistance elements 5 and 6 as compared with the conventional flow rate detecting element.

According to the seventh embodiment, as described above, the thermal conduction promoting member 22 having a higher thermal conductivity than that of the protecting film 3 is arranged on the upper surface of the protecting film 3. It is thus possible to reduce heat resistance between the heating resistance element 4 and the temperature detecting resistance elements 5 and 6, and the heat produced at the heating resistance element 4 is rapidly transmitted to the temperature detecting resistance elements 5 and 6. Even upon sudden change in the flow rate or the flow velocity of the measured fluid, therefore, a surface temperature distribution of the sensor section 15 having moved in the flow direction is rapidly formed, and a highly responsive flow rate detecting element is available.

Eighth Embodiment

While the thermal conduction promoting member 22 is arranged on the upper surface of the protecting film 3 in the foregoing seventh embodiment, the thermal conduction promoting member 22 in an eighth embodiment is embedded in the protecting film 3 so as to be at the same plane position as the upper surface of the protecting film 3.

In the eighth embodiment, there occur no surface irregularities on the sensor section 15. Disturbance of the flow of air flowing on the surface of the sensor section 15 is therefore inhibited, and a high response is available while achieving stable properties.

Because the thermal conduction promoting member 22 can be provided without increasing the thickness of the protecting film 3, it is possible to inhibit the increase in heat capacity caused by providing the thermal conduction promoting member 22, and response can be improved so much.

Ninth Embodiment

Figure 16:
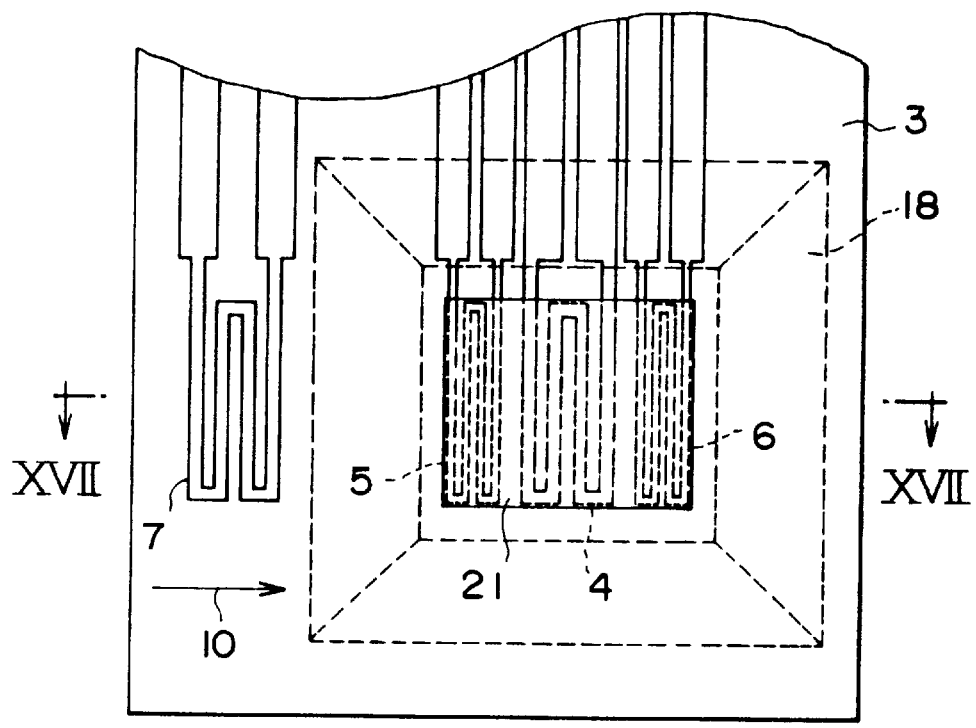
FIG. 16 is a plan view illustrating a flow rate detecting element of a ninth embodiment of the invention.
Figure 17:
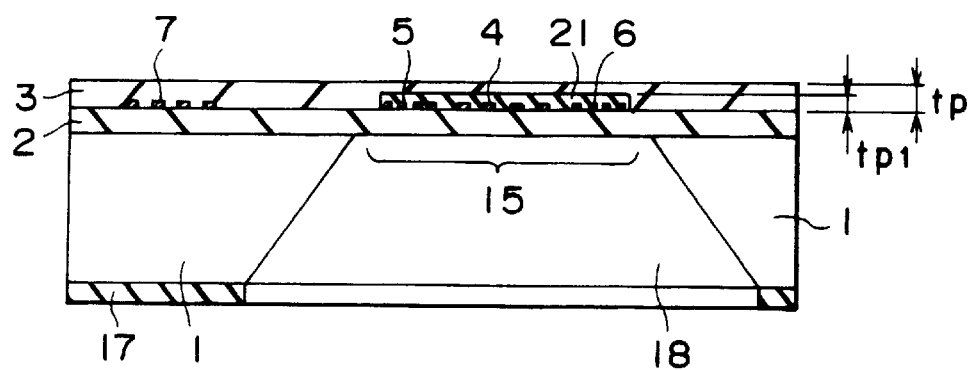
FIG. 17 is a sectional view of FIG. 16 cut along the line XVII—XVII.

FIG. 16 is a plan view illustrating a flow rate detecting element of a ninth embodiment of the invention; and FIG. 17 is a sectional view of FIG. 16 cut along the line XVII—XVII.

In the ninth embodiment, a thermal conduction promoting member 21 is formed into a rectangular shape on a supporting film 2 so as to cover a heating resistance element 4 and temperature detecting resistance elements 5 and 6, and a protecting film 3 is formed on the supporting film 2 so as to cover the thermal conduction promoting member 21. In this configuration, the sum of the thickness of the thermal conduction promoting member 21 and the thickness of the protecting film 3 on the thermal conduction promoting member 21 agrees with the thickness of the protecting film 3 on the supporting film 2.

The ninth embodiment has the same configuration as in the foregoing sixth embodiment except that the protecting film 3 on the thermal conduction promoting member 21 is formed into a thickness smaller by the thickness of the thermal conduction promoting member 21.

Preparation of the protecting film 3 comprises the steps of first forming an aluminum oxide film having a thickness tp1 on a flat substrate 1 having a supporting film 2, a heating resistance element 4, temperature detecting resistance elements 5 and 6 and a comparative resistance element 7 formed thereon, etching the aluminum oxide film into a rectangular shape by the use of the photolithographing and etching techniques, thereby forming a thermal conduction promoting member 21 to cover the heating resistance element 4 and temperature detecting resistance elements 5 and 6, and in a state of leaving a photoresist serving as a mask for etching the aluminum oxide film, forming a tp1-thick silicon nitride film. Then, the thermal conduction promoting member 21 is formed in the form embedded in the silicon nitride film so that the member 21 is at the same plane position as the silicon nitride film by removing the photoresist. Further, the protecting film 3 is formed by forming silicon nitride film into a thickness of (tp-tp1).

In the flow rate detecting element having the configuration as described above, as in the foregoing sixth embodiment, heat produced at the heating resistance element 4 is transmitted to the supporting film 2 and the thermal conduction promoting member 21 on and under the heating resistance element 4, and after transmission in the XVII—XVII direction through the films, is transmitted to the temperature detecting resistance elements 5 and 6.

Also in the ninth embodiment, as in the foregoing sixth embodiment, even upon sudden change in the flow rate or the flow velocity of the measured fluid, a surface temperature distribution of the sensor section 15 having moved in the flow direction is rapidly formed, and a responsive flow rate detecting element is available.

In the ninth embodiment, furthermore, the configuration is such that the sum of the thickness of the thermal conduction promoting member 21 and the thickness of the protecting film 3 on the thermal conduction promoting member 21 agrees with the thickness of the protecting film 3 on the supporting film 2. No surface irregularities therefore occur on the sensor section 15. As compared with the foregoing sixth embodiment, therefore, it is possible to inhibit disturbance of the flow of air flowing on the surface of the sensor section 15 and to obtain a high response while achieving stable properties.

Thermal conduction and heat capacity contribute to the transmission of heat. In the ninth embodiment, the thermal conduction promoting member 21 can be provided without increasing the thickness of the protecting film 3. The thickness tp of the protecting film 3 is therefore maintained, thereby permitting inhibition of the increase in heat capacity caused by the provision of the thermal conduction promoting member 21 and improvement of response.

Tenth Embodiment

Figure 18:
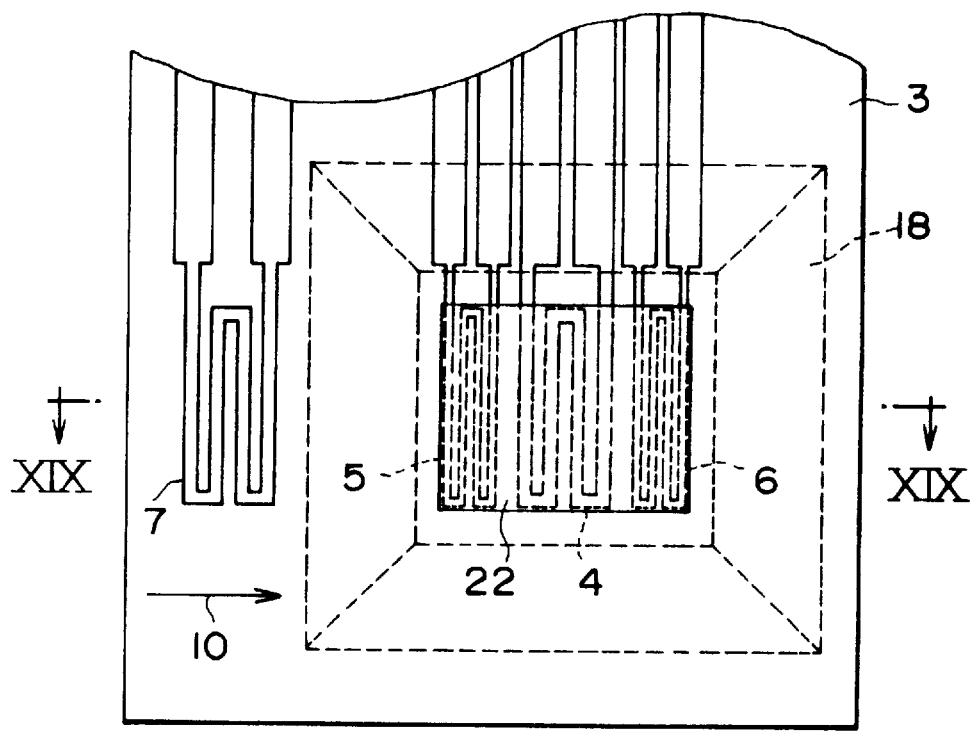
FIG. 18 is a plan view illustrating a flow rate detecting element of a tenth embodiment of the invention.
Figure 19:
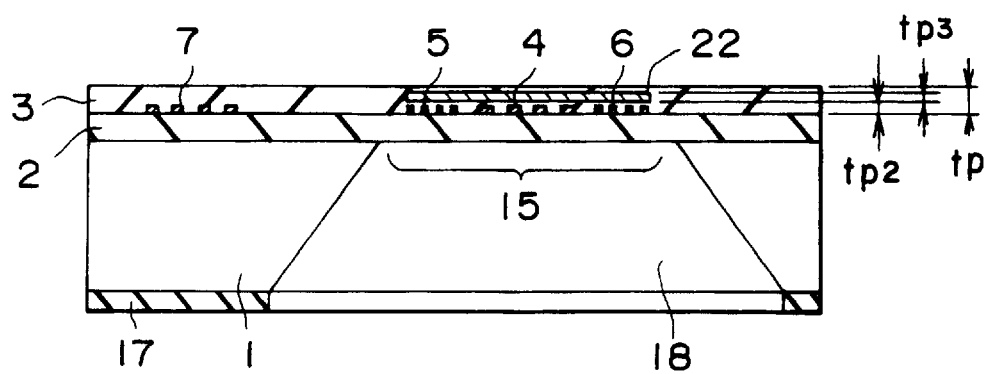
FIG. 19 is a sectional view of FIG. 18 cut along the line XIX—XIX.

FIG. 18 is a plan view illustrating a flow rate detecting element of a tenth embodiment of the invention; and FIG. 19 is a sectional view of FIG. 18 cut along the line XIX—XIX.

In the tenth embodiment, a thermal conduction promoting member 22 is formed into a rectangular shape by embeding in a protecting film 3 so as to cover the arrangement region of a heating resistance element 4 and temperature detecting resistance elements 5 and 6.

The tenth embodiment has the same configuration as in the foregoing seventh embodiment except that the thermal conduction promoting member 22 is embedded in the protecting film 3.

Preparation of the thermal conduction promoting member 22 built in the protecting film 3 comprises the steps of first forming a tp2-thick silicon nitride film on a flat substrate having a supporting film 2, a heating resistance element 4, temperature detecting resistance elements 5 and 6 and a comparative resistance element 7 formed thereon, forming a tp3-thick platinum film of the silicon nitride film, then etching the platinum film into a rectangular shape, thereby forming a thermal conduction promoting member 22, and then in a state leaving a photoresist serving as a mask for etching the platinum film, forming a tp3-thick silicon nitride film. Subsequently, the platinum film composing the thermal conduction promoting member 22 and the silicon nitride film are at the same plane position by removing the photoresist. Silicon nitride is further formed into a film of a thickness (tp-tp2-tp3), thereby forming the thermal conduction promoting member 22 embedded in the protecting film 3.

The total thickness of the protecting film 3 is controlled to tp.

In the flow rate detecting element having the configuration as described above, as in the foregoing seventh embodiment, the heat produced at the heating resistance element 4 is transmitted to the supporting film 2 and the protecting film 3 on and under the heating resistance element 4. The heat transmitted to the supporting film 2 is transmitted, after transmission in the XIX—XIX direction through the film, to the temperature detecting resistance elements 5 and 6. On the other hand, the heat transmitted to the protecting film 3 is transmitted to the thermal conduction promoting member 22, transmitted in the XIX—XIX direction through the film again to the protecting film 3, and then transmitted to the temperature detecting resistance elements 5 and 6.

Also in the tenth embodiment, as in the aforesaid seventh embodiment, even upon sudden change in the flow rate or the flow velocity of the measured fluid, a surface temperature distribution of the sensor section 15 having moved in the flow direction is rapidly formed, and a responsive flow rate detecting element is available.

Further, in the tenth embodiment, the thermal conduction promoting member 22 is embedded in the protecting film 3, resulting in the absence of surface irregularities on the sensor section 14. As compared with the foregoing seventh embodiment, therefore, it is possible to inhibit disturbance of the flow of air flowing on the sensor section 15, and to obtain a higher response while achieving stable properties.

Because the thermal conduction promoting member 22 is embedded in the protecting film 3, the distance between the heating resistance element 4 and the temperature detecting resistance elements 5 and 6, on the one hand, and the thermal conduction promoting member 22, on the other hand, is shortened, thus permitting acceleration of thermal conduction through the protecting film 3 between the heating resistance element 4 and the temperature detecting resistance elements 5 and 6, on the one hand, and the thermal conduction promoting member 22, on the other hand, and resulting improvement of response.

Thermal conduction and heat capacity contribute to the transmission of heat. In the tenth embodiment, in which the thermal conduction promoting member 22 is embedded in the protecting film 3, the thermal conduction promoting member 22 can be provided without increasing the thickness of the protecting film 3. Because this permits maintenance of the thickness of the protecting film 3, the increase in heat capacity caused by the provision of the thermal conduction promoting member 22 can be inhibited, allowing improvement of response.

While the temperature detecting resistance elements 5 and 6 arranged on the both sides of the heating resistance element 4 are formed into the same lattice-shaped patterns in the foregoing embodiments, the temperature detecting resistance elements may be formed into different lattice-shaped patterns. In this case, in the course of measuring the flow rate and the flow velocity of the measure fluid, it suffices to compare the quantities corresponding to measures values of temperature from the temperature detecting resistance elements 5 and 6 after compensation of these quantities taking account of the difference in lattice-shaped pattern between the temperature detecting resistance elements 5 and 6.

The foregoing embodiments have been described on the assumption of the present invention to a flow rate detecting element of the diaphragm type. Similar effects are however available even when applying the invention to a bridge type flow rate detecting element.

In the foregoing embodiments, the supporting film 2, the protecting film 3, the heating resistance element 4, the temperature detecting resistance elements 5 and 6, and the thermal conduction promoting members 11, 20, 21 and 22 have been described as being formed by sputtering. The method of forming films is not limited to sputtering, but vacuum vapor deposition, CVD or any other film forming method may be applied.

In the embodiments described above, the heating resistance element 4 and the temperature detecting resistance elements 5 and 6 have been described as being made of platinum. However, the material is not limited to platinum, but a material having a satisfactory temperature dependency resistance, such as permalloy, which is an alloy of iron and nickel, may be applicable.

The supporting film 2 and the protecting film 3 have been described as being made of silicon nitride in the foregoing embodiments. The material is not however limited to silicon nitride, but a material having insulation, such as tantalum pentoxide ($Ta_2O_5$) or silicon dioxide ($SiO_2$) is applicable. The material for the thermal conduction promoting member which have been described as being made of platinum or aluminum oxide, suffices to have a higher thermal conductivity than the supporting film 2 and the protecting film 3, including gold (Au), copper (Cu), silver (Ag), schirmine (AlSi) and titanium nitride (TiN).

Eleventh Embodiment

Figure 20:
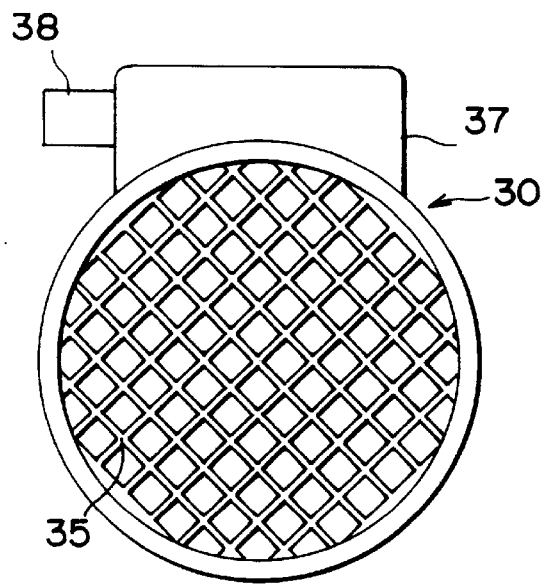
FIG. 20 is a front view illustrating a flow rate sensor of an eleventh embodiment of the invention.
Figure 21:
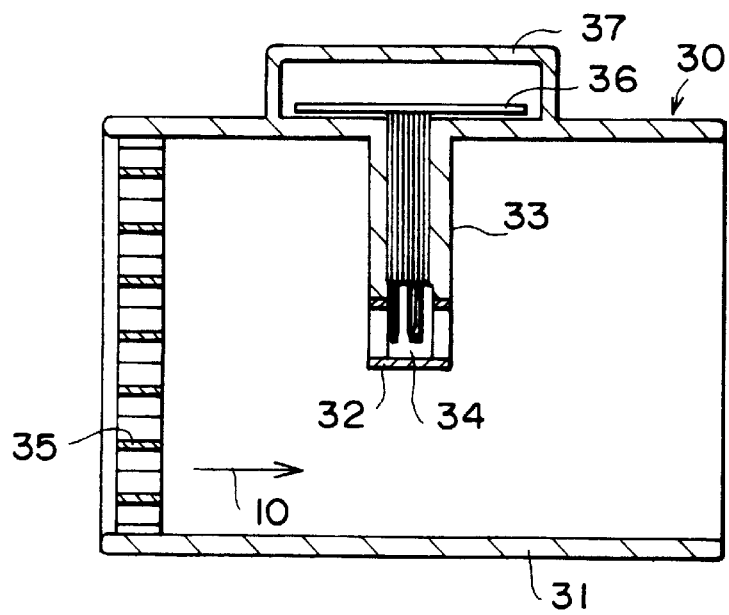
FIG. 21 is a cross-sectional view illustrating the flow rate sensor of the eleventh embodiment of the invention.
Figure 22:
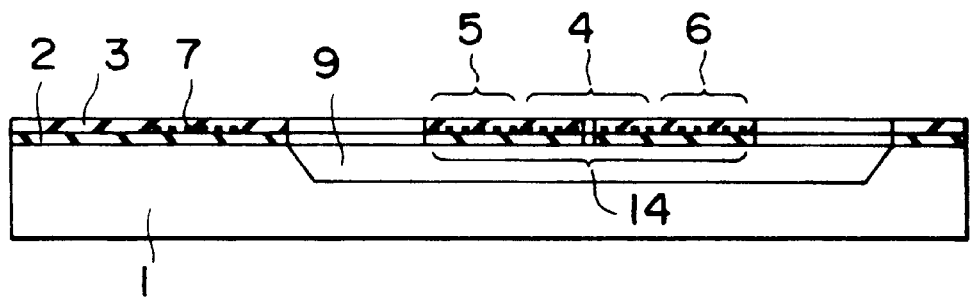
FIG. 22 is a sectional view illustrating a conventional flow rate detecting element.
Figure 23:
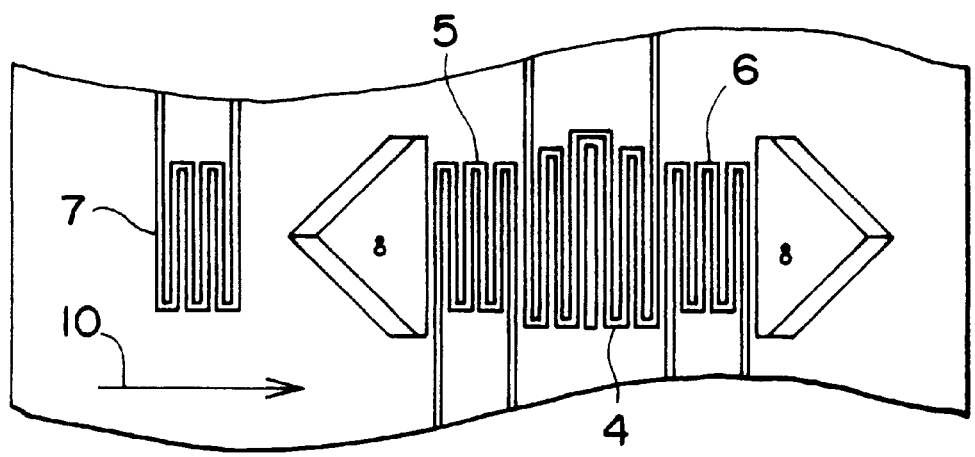
FIG. 23 is a plan view illustrating an important portion of the conventional flow rate detecting element.
Figure 24:
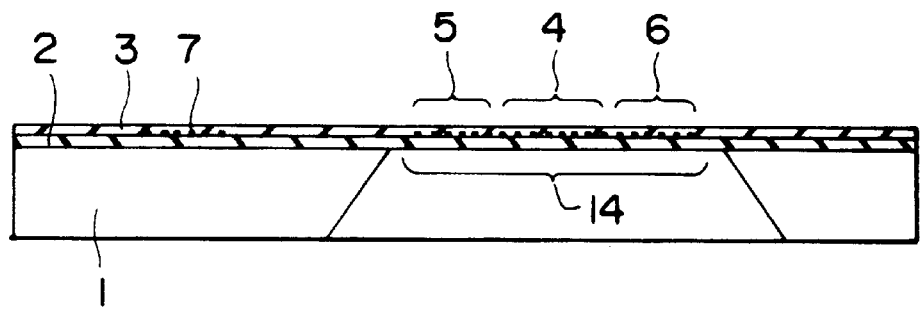
FIG. 24 is a sectional view illustrating another example of conventional flow rate detecting element.
Figure 25:
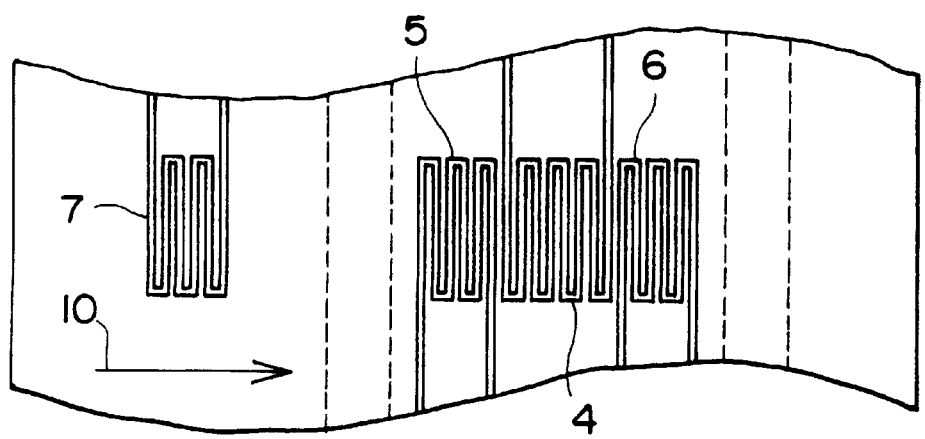
FIG. 25 is a plan view illustrating an important portion of another conventional flow rate detecting element.

FIGS. 20 and 21 are a front view and a cross-sectional view illustrating a flow rate sensor of an eleventh embodiment of the invention.

In FIGS. 20 and 21, a main tube 31 is cylindrical in shape and forms a path for a measured fluid. A cylindrical measuring conduit 32 is arranged coaxially, supported by a supporting arm 33 extending radially inward from the inner wall of the main tube 31. In the measuring conduit 32, a flow rate detecting element 34 according to the foregoing first embodiment of the invention is arranged, with a heating resistance element and a pair of temperature detecting resistance elements of which the arrangement direction agrees with the axial center direction of the measuring conduit 32.

A lattice-shaped rectifier 35 for rectifying the flow of the measured fluid is attached on one end side of the main tube 31. A control circuit 36 serving as a control section and a temperature measuring section is housed in a case 37 provided on the outer periphery of the main tube 31. This control circuit 36 is electrically connected to the heating resistance element, the temperature detecting resistance elements and the comparative resistance element of the flow rate detecting element 34 via electrode pads. A connector 38 for feeding power to the flow rate detecting element 34 and receiving an output signal is provided in the case 37.

The flow rate sensor 30 having the configuration as described above is attached to an inlet pipe of an internal combustion engine, for example, to be applied for measuring the amount of inlet air. In this case, the inlet pipe corresponds to the main tube 31.

In the flow rate sensor 30, power is fed through the connector 38 to the flow rate detecting element 34, and temperature of the heating resistance element is controlled by the control circuit 36 so as to be higher by 200° C. than the air temperature as measured by the comparative resistance element. Temperature of the pair of temperature detecting resistance elements is measured by the control circuit 36 and provided as an output through the connector 38.

The inlet air is rectified by the rectifier 35 and flows into the main tube 31. A part of the inlet air having entered into the main tube 31 flows into the measuring conduit 32 and flows through from one side facing one of the temperature detecting resistance elements to the other side along the surface of the sensor section.

The air flow causes a decrease in temperature of the temperature detecting resistance element in the upstream, and an increase in temperature of the temperature detecting resistance element in the downstream. Temperature of the pair of temperature detecting resistance elements is measured via the control circuit 36. As described in the foregoing first embodiment, the flow rate, the flow direction or the flow velocity of air is detected on the basis of the difference in temperature between the pair of temperature detecting resistance elements, and is used for the control of the amount of inlet air of the internal combustion engine.

According to the eleventh embodiment, therefore, the flow rate detecting element 34 has the configuration as in the foregoing first embodiment. It is therefore possible to obtain a flow rate sensor having a sufficient strength and a satisfactory response.

The flow rate sensor 34 is well applicable for the measurement of the amount of inlet air for an internal engine in which inlet air forms a pulsation flow dependent upon the number of revolutions, and particularly in the high-load region, there is a considerable increase in fluctuation of flow rate, and in the high rotation region, the speed of flow rate fluctuation is high.

The flow rate sensor 30 can withstand sufficiently the measurement of an amount of inlet air of an internal combustion engine in which the maximum flow velocity of inlet air reaches even a level close to 200 m/s.

In the above-mentioned eleventh embodiment, the flow rate sensor 30 has been described as using the flow rate detecting element of the foregoing first embodiment. The same effects are however available by using the flow rate detecting element of any other embodiment.

The present invention having the configurations as described above brings about the following advantages.

According to the invention, there is provided a flow rate detecting element comprising a flat substrate provided with a gap opening on at least one side surface thereof; a sensor section which a heating resistance element and a pair of temperature detecting resistance elements arranged on the both sides of the heating resistance element are wrapped by an insulating supporting film and an insulating protecting film from above and below, wherein the sensor section is arranged on a plane substantially in parallel with a surface of the flat substrate and at least one end of the supporting film is held by the flat substrate so as to be located the sensor section on the gap, whereby most part of the sensor section being arranged in a non-contact state with the flat substrate; and a thin-film-shaped thermal conduction promoting member provided on a heat transmitting path of the sensor section between the heating resistance element and the pair of temperature detecting resistance elements and having a higher thermal conductivity than at least any of the supporting film and the protecting film. There is therefore available a flow rate detecting element in which it is possible to reduce heat resistance between the heating resistance element and the temperature detecting resistance elements, to improve response without decreasing strength, and to increase strength without degrading response.

In an embodiment of the invention, thermal conduction promoting members are arranged on the supporting film so as to extend in a direction at right angles to the arranging direction of the heating resistance element and the pair of temperature detecting resistance elements between the heating resistance element and the pair of temperature detecting resistance element respectively. Heat produced at the heating resistance element is transmitted once to the thermal conduction promoting member through the supporting film and the protecting film, and after transmission through the thermal conduction promoting member, transmitted to the temperature detecting resistance elements through the supporting film and the protecting film. The heat produced at the heating resistance element is transmitted mainly through the thermal conduction promoting member, thus reducing the distance of conduction through the supporting film and the protecting films not permitting easy conduction, and allowing improvement of response.

In another embodiment of the invention, the thermal conduction promoting member is made of an insulating material having a higher thermal conductivity than that of the supporting film and is provided on the surface of the supporting film so as to be located below the arrangement region of the heating resistance element and the pair of temperature detecting resistance elements and so as to be in contact with the heating resistance element and the pair of temperature detecting resistance elements. The heat produced at the heating resistance element and transmitted through the heat transmitting path on the supporting film side is transmitted directly through the thermal conduction promoting member to the temperature detecting resistance elements, thus permitting improvement of response.

In another embodiment of the invention, the thermal conduction promoting member is embedded in the supporting film so as to be at the same position as the surface of the supporting film. There is therefore no surface irregularities on the sensor section caused by the provision of the thermal conduction promoting member, and no disturbance of the flow of the fluid flowing on the surface of the sensor section, thus permitting stabilization of properties. It is also possible to form the thermal conduction promoting member without increasing the thickness of the supporting film, and inhibit increase in the heat capacity caused by the provision of the thermal conduction promoting member, thus permitting improvement of response.

In another embodiment of the invention, the thermal conduction promoting member is made of a material having a higher thermal conductivity than that of the supporting film and is embedded in the supporting film so as to be located below the arrangement region of the heating resistance element and the pair of temperature detecting resistance elements and so as not to be in contact with the heating resistance element and the pair of temperature detecting resistance elements. The heat produced at the heating resistance element and transmitted through the heat transmitting path on the supporting film side is transmitted through the supporting film once to the thermal conduction promoting member, and after transmission through the thermal conduction promoting member, transmitted through the supporting film to the temperature detecting resistance elements. The heat produced at the heating resistance element is transmitted mainly through the thermal conduction promoting member, thus reducing the distance of conduction through the supporting film not permitting easy conduction, and allowing improvement of response.

In another embodiment of the invention, the thickness of the supporting film at the portion in which the thermal conduction promoting member is embedded is smaller than the thickness of the supporting film at the portion in which the thermal conduction promoting member is not embedded by the thickness of the thermal conduction promoting member, whereby the surface of the supporting film on the side in contact with the heating resistance element and the pair of temperature detecting resistance elements being made smooth. There is therefore no surface irregularities on the sensor section caused by the provision of the thermal conduction promoting member, and no disturbance of the flow of the fluid flowing on the surface of the sensor section, thus permitting stabilization of properties. It is also possible to form the thermal conduction promoting member without increasing the thickness of the supporting film, and inhibit increase in the heat capacity caused by the provision of the thermal conduction promoting member, thus permitting improvement of response.

In another embodiment of the invention, the thermal conduction promoting member is made of a material having a higher thermal conductivity than that of the supporting film and is provided on the surface of the supporting film on the gap side so as to be located below the arrangement region of the heating resistance element and the pair of temperature detecting resistance elements. The heat produced at the heating resistance element and transmitted through the heat transmitting path on the supporting film side is transmitted mainly through the thermal conduction promoting member, and the distance of transmission through the supporting film not permitting easy conduction is reduced, thereby permitting improvement of response.

In another embodiment of the invention, the thermal conduction promoting member is made of an insulating material having a higher thermal conductivity than that of the protecting film and is provided on the lower surface of the protecting film so as to be located above the management region of the heating resistance element and the pair of temperature detecting resistance elements and so as to be in contact with the heating resistance element and the pair of temperature detecting resistance elements. The heat produced at the heating resistance element and transmitted through the heat transmitting path on the protecting film side is transmitted directly through the thermal conduction promoting member to the temperature detecting resistance elements, thus permitting improvement of response.

In another embodiment of the invention, the thermal conduction promoting member is made of a material having a higher thermal conductivity than that of the protecting film and is embedded in the protecting film so as to be located above the arrangement region of the heating resistance element and the pair of temperature detecting resistance elements and so as not to be in contact with the heating resistance element and the pair of temperature detecting resistance elements. Therefore, the heat produced at the heating resistance element and transmitted through the heat transmitting path on the protecting film side is once transmitted through the protecting film to the thermal conduction promoting member, and after transmission through the thermal conduction promoting member, transmitted through the protecting film to the temperature detecting resistance elements. The heat produced at the heating resistance element and transmitted through the heat transmitting path on the protecting film side is transmitted mainly through the thermal conduction promoting member, and the distance of transmission through the supporting film not permitting easy conduction is reduced, thus permitting improvement of response.

In another embodiment of the invention, the thermal conduction promoting member is made of a material having a higher thermal conductivity than that of the protecting film and is provided on the upper surface of the protecting film so as to be located above the arrangement region of the heating resistance element and the pair of temperature detecting resistance elements. Therefore, the heat produced at the heating resistance element and transmitted through the heat transmitting path on the protecting film side is once transmitted to the thermal conduction promoting member, and after transmission through the thermal conduction promoting member, transmitted through the protecting film to the temperature detecting resistance elements. The heat produced at the heating resistance element and transmitted through the heat transmitting path on the protecting film side is mainly transmitted through the thermal conduction promoting member, and the distance of transmission through the supporting film not permitting easy heat conduction is reduced, thus permitting improvement of response.

In another embodiment of the invention, the thickness of the portion of the protecting film having the thermal conduction promoting member is smaller than the thickness of the portion of the protecting film not having the thermal conduction promoting member by the thickness of the thermal conduction promoting member, whereby the upper surface of the protecting film being made smooth. Therefore, there is no surface irregularities on the sensor section caused by the provision of the thermal conduction promoting member, and no disturbance of the flow of the fluid flowing on the surface of the sensor section, thus permitting stabilization of properties. It is also possible to form the thermal conduction promoting member without increasing the thickness of the supporting film, and inhibit the increase in the heat capacity caused by the provision of the thermal conduction promoting member, thus permitting improvement of response.

Further, according to the present invention, there is provided a flow rate sensor comprising a measuring conduit having a cylindrical shape and arranged in a path of a measured fluid with an axial direction thereof substantially agreeing with the flow direction of the measured fluid; a flow rate detecting element having a flat substrate provided with a gap opening on at least one side surface thereof, a sensor section which a heating resistance element and a pair of temperature detecting resistance elements arranged on the both sides of the heating resistance element are wrapped by an insulating supporting film and an insulating protecting film from above and below, wherein the sensor section is arranged on a plane substantially in parallel with a surface of the flat substrate and at least one end of the supporting film is held by the flat substrate so as to be located the sensor section on the gap, whereby most part of the sensor section being arranged in a non-contact state with the flat substrate, and a thin-film-shaped thermal conduction promoting member provided on a heat transmitting path of the sensor section between the heating resistance element and the pair of temperature detecting resistance elements and having a higher thermal conductivity than at least any of the supporting film and the protecting film; a control section which holds the heating resistance element at a prescribed temperature by controlling power fed to the heating resistance element; and a temperature measuring section which measures temperature of the pair of temperature detecting resistance elements. There is therefore available a flow rate sensor which permits high-response measurement of the flow rate, the flow velocity or the flow direction of a measure fluid, and is applicable for measurement of the amount of inlet air of an internal combustion engine.

What is claimed is:

1. A flow rate detecting element comprising:
    a flat substrate provided with a gap opening on at least one side surface thereof;
    a sensor section including a heating resistance element and a pair of temperature detecting resistance elements arranged on opposite sides of said heating resistance element, and wrapped by an insulating supporting film and an insulating protecting film from above and below, wherein said sensor section is arranged on a plane substantially parallel with a surface of said flat substrate and at least one end of said supporting film is held by said flat substrate to locate said sensor section over said gap, whereby a major portion of said sensor section is disposed in a non-contact state with said flat substrate; and
    a thermal conduction promoting member in the form of a thin-film disposed in a heat transmitting path of said sensor section between said heating resistance element and said pair of temperature detecting resistance elements, said thermal conduction promoting member having a substantially higher thermal conductivity than said supporting film and said protecting film.

2. The flow rate detecting element according to claim 1, wherein said thermal conduction promoting member is arranged on said supporting film so as to extend in a direction at right angles to an arranging direction of said heating resistance element and said pair of temperature detecting resistance elements between the heating resistance element and the pair of temperature detecting resistance element respectively.

3. The flow rate detecting element according to claim 1, wherein said thermal conduction promoting member is made of an insulating material having a higher thermal conductivity than that of said supporting film and is provided on the surface of said supporting film so as to locate below a region of said heating resistance element and the pair of temperature detecting resistance elements and so as to be in contact with said heating resistance element and the pair of temperature detecting resistance elements.

4. The flow rate detecting element according to claim 3, wherein said thermal conduction promoting member is embedded in said supporting film so as to be at the same position as the surface of said supporting film.

5. The flow rate detecting element according to claim 1, wherein said thermal conduction promoting member is made of a material having a higher thermal conductivity than that of said supporting film and is embedded in said supporting film so as to locate below a region of said heating resistance element and the pair of temperature detecting resistance elements and so as not to be in contact with said heating resistance element and said pair of temperature detecting resistance elements.

6. The flow rate detecting element according to claim 5, wherein the thickness of said supporting film at the portion in which said thermal conduction promoting member is embedded is smaller than the thickness of said supporting film at the portion in which said thermal conduction promoting member is not embedded by the thickness of said thermal conduction promoting member, whereby the surface of said supporting film on the side in contact with said heating resistance element and the pair of temperature detecting resistance elements being made smooth.

7. The flow rate detecting element according to claim 1, wherein said thermal conduction promoting member is made of a material having a higher thermal conductivity than that of the supporting film and is provided on the surface of said supporting film on the gap side so as to be located below a region of said heating resistance element and the pair of temperature detecting resistance elements.

8. The flow rate detecting element according to claim 1, wherein said thermal conduction promoting member is made of an insulating material having a higher thermal conductivity than that of said protecting film and is provided on the lower surface of said protecting film so as to be located above a region of said heating resistance element and the pair of temperature detecting resistance elements and so as to be in contact with said heating resistance element and the pair of temperature detecting resistance elements.

9. The flow rate detecting element according to claim 8, wherein the thickness of the portion of said protecting film having said thermal conduction promoting member is smaller than the thickness of the portion of said protecting film not having said thermal conduction promoting member by the thickness of said thermal conduction promoting member, whereby the upper surface of said protecting film being made smooth.

10. The flow rate detecting element according to claim 1, wherein said thermal conduction promoting member is made of a material having a higher thermal conductivity than that of said protecting film and is embedded in said protecting film so as to be located above a region of said heating resistance element and the pair of temperature detecting resistance elements and so as not to be in contact with said heating resistance element and the pair of temperature detecting resistance elements.

11. The flow rate detecting element according to claim 10, wherein the thickness of the portion of said protecting film having said thermal conduction promoting member is smaller than the thickness of the portion of said protecting film not having said thermal conduction promoting member by the thickness of said thermal conduction promoting member, whereby the upper surface of said protecting film being made smooth.

12. The flow rate detecting element according to claim 1, wherein said thermal conduction promoting member is made of a material having a higher thermal conductivity than that of said protecting film and is provided on the upper surface of said protecting film so as to be located above a region of said heating resistance element and the pair of temperature detecting resistance elements.

13. The flow rate detecting element according to claim 12, wherein the thickness of the portion of said protecting film having said thermal conduction promoting member is smaller than the thickness of the portion of said protecting film not having said thermal conduction promoting member by the thickness of said thermal conduction promoting member, whereby the upper surface of said protecting film being made smooth.

14. A flow rate sensor comprising:

a measuring conduit having a cylindrical shape and arranged in a path of a measured fluid with an axial direction thereof substantially coincident with the flow direction of the measured fluid;

a flow rate detecting element having a flat substrate provided with a gap opening on at least one side surface thereof, a sensor section including a heating resistance element and a pair of temperature detecting resistance elements arranged on opposite sides of said heating resistance element, and wrapped by an insulating supporting film and an insulating protecting film from above and below, wherein said sensor section is arranged on a plane substantially parallel with a surface of said flat substrate and at least one end of said supporting film is held by said flat substrate to locate said sensor section over said gap, whereby a major portion of said sensor section is disposed in a non-contact state with said flat substrate, and a thermal conduction promoting member in the form of a thin film disposed in a heat transmitting path of said sensor section between said heating resistance element and said pair of temperature detecting resistance elements, said thermal conduction promoting member having a substantially higher thermal conductivity than said supporting film and said protecting film;

a control section which maintains said heating resistance element at a prescribed temperature by controlling power fed to said heating resistance element; and a temperature measuring section which measures temperature of said pair of temperature detecting resistance elements.

* * * * *